(12) United States Patent
Solheid et al.

(10) Patent No.: US 8,606,067 B2
(45) Date of Patent: Dec. 10, 2013

(54) PEDESTAL TERMINAL WITH SWING FRAME

(75) Inventors: James J. Solheid, Lakeville, MN (US); Matthew Holmberg, Le Center, MN (US); Paul Kmit, Maple Grove, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 486 days.

(21) Appl. No.: 12/875,274

(22) Filed: Sep. 3, 2010

(65) Prior Publication Data

US 2011/0058785 A1    Mar. 10, 2011

Related U.S. Application Data

(60) Provisional application No. 61/239,839, filed on Sep. 4, 2009.

(51) Int. Cl.
*G02B 6/46* (2006.01)

(52) U.S. Cl.
USPC .......................................................... 385/135

(58) Field of Classification Search
USPC ................................................ 385/134, 135
See application file for complete search history.

(56) References Cited

U.S. PATENT DOCUMENTS

| | | | |
|---|---|---|---|
| 6,215,938 B1 | 4/2001 | Reitmeier et al. |
| 6,480,660 B1 | 11/2002 | Reitmeier et al. |
| 6,983,095 B2 | 1/2006 | Reagan et al. |
| 7,088,899 B2 | 8/2006 | Reagan et al. |
| 7,103,255 B2 | 9/2006 | Reagan et al. |
| 7,146,089 B2 | 12/2006 | Reagan et al. |
| 7,171,102 B2 | 1/2007 | Reagan et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,245,809 B1 | 7/2007 | Gniadek et al. |
| 7,277,620 B2 | 10/2007 | Vongseng et al. |
| 7,359,610 B2 | 4/2008 | Vongseng |
| 7,369,741 B2 | 5/2008 | Reagan et al. |
| 7,376,322 B2 | 5/2008 | Zimmel et al. |

(Continued)

FOREIGN PATENT DOCUMENTS

WO    WO 2006/135524 A2    12/2006

OTHER PUBLICATIONS

International Search Report and Written Opinion mailed Jun. 3, 2011.

*Primary Examiner* — Sarah Hahm
(74) *Attorney, Agent, or Firm* — Merchant & Gould P.C.

(57) ABSTRACT

A pedestal terminal includes a frame mounted to a base and a cover configured to mount to the base. The frame including a support frame and a swing frame pivotally mounted to the support frame. A splitter module mounting location is positioned on the frame. The splitter module mounting location is adapted to mount a splitter arrangement including splitter pigtails to the frame. A first termination field includes a plurality of fiber optic adapters, each being configured to couple one of the splitter pigtails to a distribution cable. A second termination field includes a plurality of fiber optic adapters, each being configured to couple one of the splitter pigtails to a drop cable. A pivoting cover arrangement can be mounted to a top of the support frame to inhibit contact between the splitter arrangement and the cover when the cover is mounted to or removed from the base.

17 Claims, 21 Drawing Sheets

(56) References Cited

U.S. PATENT DOCUMENTS

| | | |
|---|---|---|
| 7,376,323 B2 | 5/2008 | Zimmel |
| 7,400,813 B2 | 7/2008 | Zimmel |
| 7,400,816 B2 | 7/2008 | Reagan et al. |
| 7,407,330 B2 | 8/2008 | Smith et al. |
| 7,416,349 B2 | 8/2008 | Kramer |
| 7,418,181 B2 | 8/2008 | Zimmel et al. |
| 7,421,183 B2 | 9/2008 | Vongseng |
| 7,457,503 B2 | 11/2008 | Solheid et al. |
| 7,471,869 B2 | 12/2008 | Reagan et al. |
| 7,606,459 B2 | 10/2009 | Zimmel et al. |
| 7,646,958 B1 | 1/2010 | Reagan et al. |
| 7,676,136 B2 * | 3/2010 | Wakileh et al. ............... 385/135 |
| 7,720,344 B2 | 5/2010 | Tang et al. |
| 2004/0228598 A1 | 11/2004 | Allen et al. |
| 2005/0129379 A1 | 6/2005 | Reagan et al. |
| 2006/0008231 A1 | 1/2006 | Reagan et al. |
| 2006/0228086 A1 | 10/2006 | Holmberg et al. |
| 2007/0031100 A1 | 2/2007 | Garcia et al. |
| 2007/0036507 A1 | 2/2007 | Allen et al. |
| 2007/0147765 A1 | 6/2007 | Gniadek et al. |
| 2007/0189691 A1 | 8/2007 | Barth et al. |
| 2007/0192817 A1 | 8/2007 | Landry et al. |
| 2007/0230887 A1 | 10/2007 | Vongseng |
| 2008/0008436 A1 | 1/2008 | Reagan et al. |
| 2008/0013910 A1 | 1/2008 | Reagan et al. |
| 2008/0019655 A1 | 1/2008 | Vongseng et al. |
| 2008/0025684 A1 | 1/2008 | Vongseng et al. |
| 2008/0079341 A1 | 4/2008 | Anderson et al. |
| 2008/0124038 A1 | 5/2008 | Kowalczyk et al. |
| 2008/0124039 A1 | 5/2008 | Gniadek et al. |
| 2008/0219630 A1 | 9/2008 | Kowalczyk et al. |
| 2008/0317425 A1 | 12/2008 | Smith et al. |
| 2009/0016688 A1 | 1/2009 | Zimmel et al. |
| 2009/0022468 A1 | 1/2009 | Zimmel |
| 2009/0022469 A1 | 1/2009 | Zimmel |
| 2009/0067801 A1 | 3/2009 | Vongseng |
| 2009/0074372 A1 | 3/2009 | Solheid et al. |
| 2009/0087157 A1 | 4/2009 | Smith et al. |
| 2009/0103879 A1 | 4/2009 | Tang et al. |
| 2009/0110359 A1 | 4/2009 | Smith et al. |
| 2009/0190896 A1 | 7/2009 | Smith et al. |
| 2009/0196565 A1 | 8/2009 | Vongseng et al. |
| 2009/0226143 A1 | 9/2009 | Beck |
| 2009/0238530 A1 | 9/2009 | Wakileh et al. |
| 2009/0263096 A1 | 10/2009 | Solheid et al. |
| 2009/0263097 A1 | 10/2009 | Solheid et al. |
| 2009/0285540 A1 | 11/2009 | Reagan et al. |
| 2009/0290843 A1 | 11/2009 | Reagan et al. |
| 2009/0324187 A1 | 12/2009 | Wakileh et al. |
| 2010/0124392 A1 | 5/2010 | Reagan et al. |
| 2010/0226615 A1 | 9/2010 | Reagan et al. |

\* cited by examiner

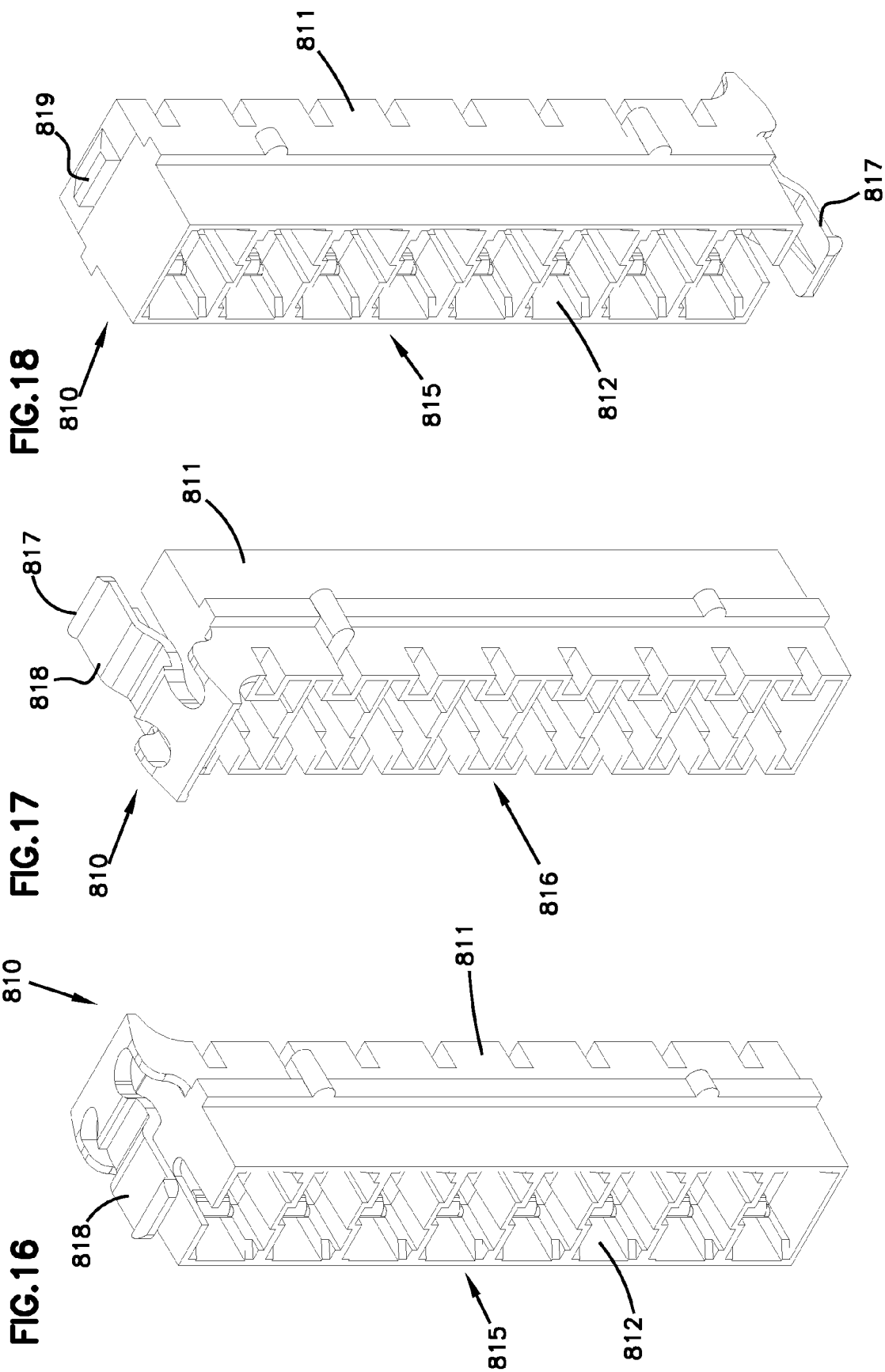

PEDESTAL TERMINAL WITH SWING FRAME

CROSS-REFERENCE TO RELATED APPLICATION

This application claims the benefit of U.S. Provisional Patent Application Ser. No. 61/239,839, filed Sep. 4, 2009, which application is hereby incorporated by reference in its entirety.

BACKGROUND

Expansion of fiber optic based telecommunication service is being expended to greater diversity of businesses and homes. Many of these extensions of service within neighborhoods, industrial parks and business developments utilize optical fiber distribution cables laid within buried conduit. Passive optical networks for such services are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

An example network can include a central office that connects a number of end subscribers (also called end users herein) in a network. The central office can additionally connect to one or more larger networks, such as the Internet (not shown) and a public switched telephone network (PSTN). Some cables in the network can be branched out from main cable lines and routed to fiber distribution and access terminals (e.g., fiber distribution hubs or pedestals). Such branched cables might extend from the fiber distribution and access terminal to a smaller fiber access terminal (e.g., optical network terminal or drop terminal) directly adjacent the business or home to which service may be provided. The various lines of the network can be aerial or housed within underground conduits.

Splitters used in fiber distribution and access terminals can accept feeder cables having a number of fibers and may split those incoming fibers into, for example, 216 to 432 individual distribution fibers that may be associated with a like number of end user locations. In typical applications, an optical splitter is provided prepackaged in an optical splitter module housing and provided with splitter output pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to fiber distribution and access terminals as required.

Improvements to current fiber distribution cables and fiber access terminals are desirable.

SUMMARY

Certain aspects of the disclosure relate to pedestal fiber distribution terminals that provide an interface between one or more feeder cables and one or more distribution and/or drop cables. Certain aspects relate to features adapted to protect optical components within the pedestal without interfering with accessing such optical components. For example, a pivoting swing frame facilitates access to components stored on the support frame and on a rear of the swing frame. Other aspects relate to features that enhance cable management, ease of use, and scalability.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

Referring to the drawing, wherein like numerals represent like parts throughout the several views:

FIGS. 16-18 illustrate an example storage arrangement in accordance with the principles of the present disclosure;

DETAILED DESCRIPTION

Figure 1:
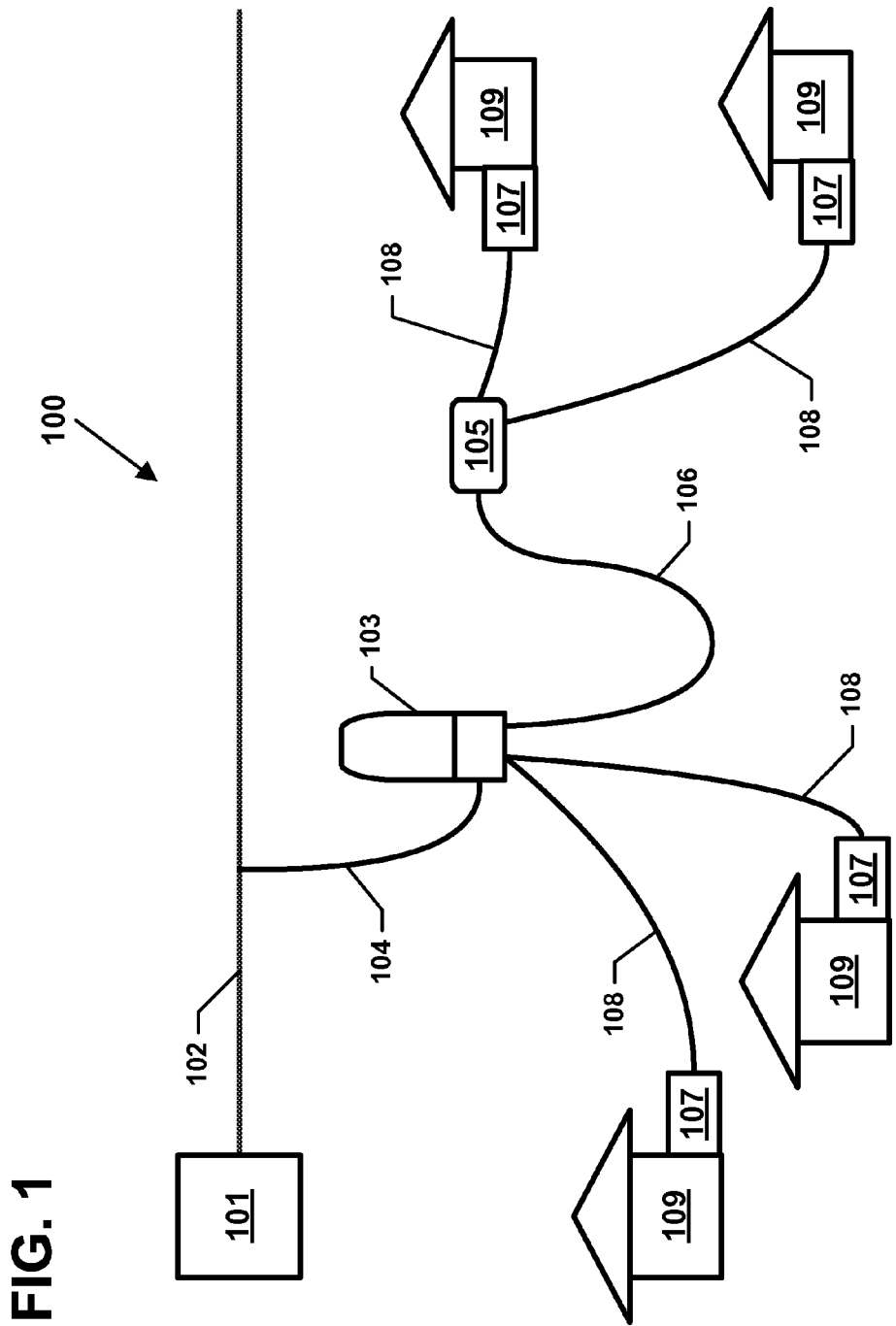
FIG. 1 illustrates a network deploying passive fiber optic lines and including a central office that connects a number of end subscribers (also called end users herein) in a network in accordance with the principles of the present disclosure.

FIG. 1 illustrates an example network 100 deploying passive fiber optic lines. As shown, the network 100 includes a central office 101 that connects a number of end users 109 to which service may be provided. The central office 101 can additionally connect to one or more larger networks, such as the Internet (not shown) and a public switched telephone network (PSTN). An example feeder cable 104 in the network 100 is branched out from main cable lines 102 and routed to a fiber distribution terminal (e.g., a hub or a pedestal) 103. Of course, multiple feeder cables can branch out from the main cables 102 and be routed to pedestal terminals and/or fiber distribution hubs.

Each fiber distribution terminal 103 generally administers connections at a termination panel between incoming fiber and outgoing fiber. The fiber distribution terminal 103 includes one or more splitters, which facilitate optical coupling between fibers of the feeder cable 104 and one or more distribution cables 106 and/or one or more drop cables 108. The distribution cables 106 can be routed to one or more drop terminals 105. One or more drop cables 108 are routed from the drop terminals 105 to optical network terminals (ONT) 107. The ONTs 107 service the individual end users 109. In accordance with aspects of the disclosure, some drop cables 108 can be routed to the ONTs 107 directly from the pedestal terminal 103. The various lines of the network 100 can be aerial or housed within underground conduits.

As the term is used herein, "a connection" between fibers includes both direct and indirect connections. Examples of incoming optical fibers as the term is used herein include the fibers of a feeder cable 104 that enters the terminal 103 and intermediate fibers that connect the feeder cable fibers to the termination region as will be described in greater detail herein. Examples of such intermediate fibers include connectorized pigtails extending from one or more splitters and fibers that extend from a splitter and that are spliced or otherwise connected to the feeder cable. Examples of outgoing fibers include the fibers of the distribution cables 106 and drop cables 108 that exit the terminal 103 and any intermediate fibers that connect the these cables to the termination region.

As the term is used herein, a fiber or cable is "precabled" when the fiber or cable is routed within the terminal 103 prior to being installed within the network 100. For example, a fiber or cable can be precabled within the terminal 103 at a factory or manufacturing plant at which the terminal 103 is assembled. Such pre-cabling can enhanced the efficiency of deploying the terminal 103 within the network since a technician will have fewer cables to route during deployment. Such pre-cabling also reduces the amount and complexity of cable routing that needs to be performed in the field.

Figure 2:
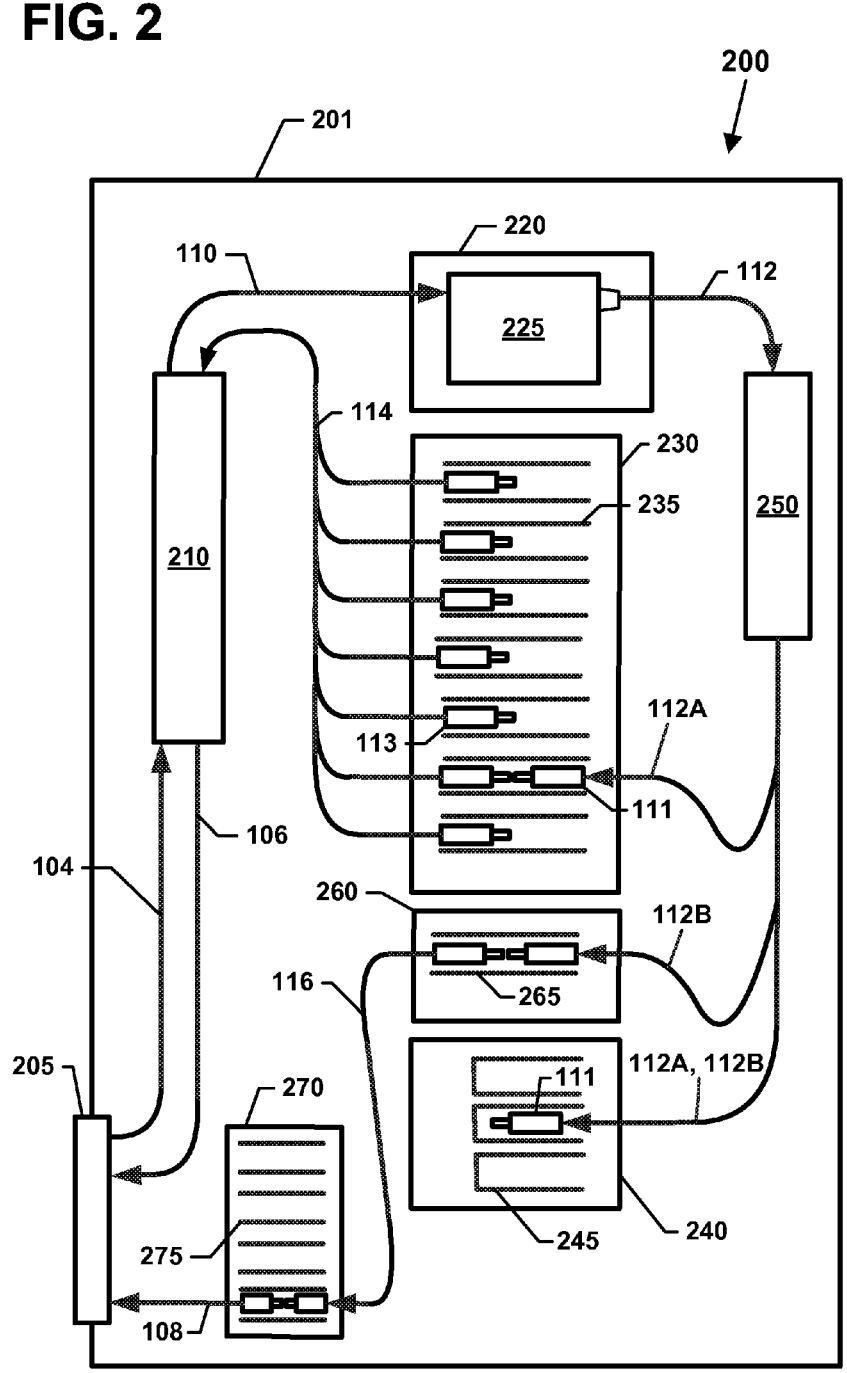
FIG. 2 is schematic diagram showing an example cable routing scheme for an example pedestal in accordance with the principles of the present disclosure.
Figure 3:
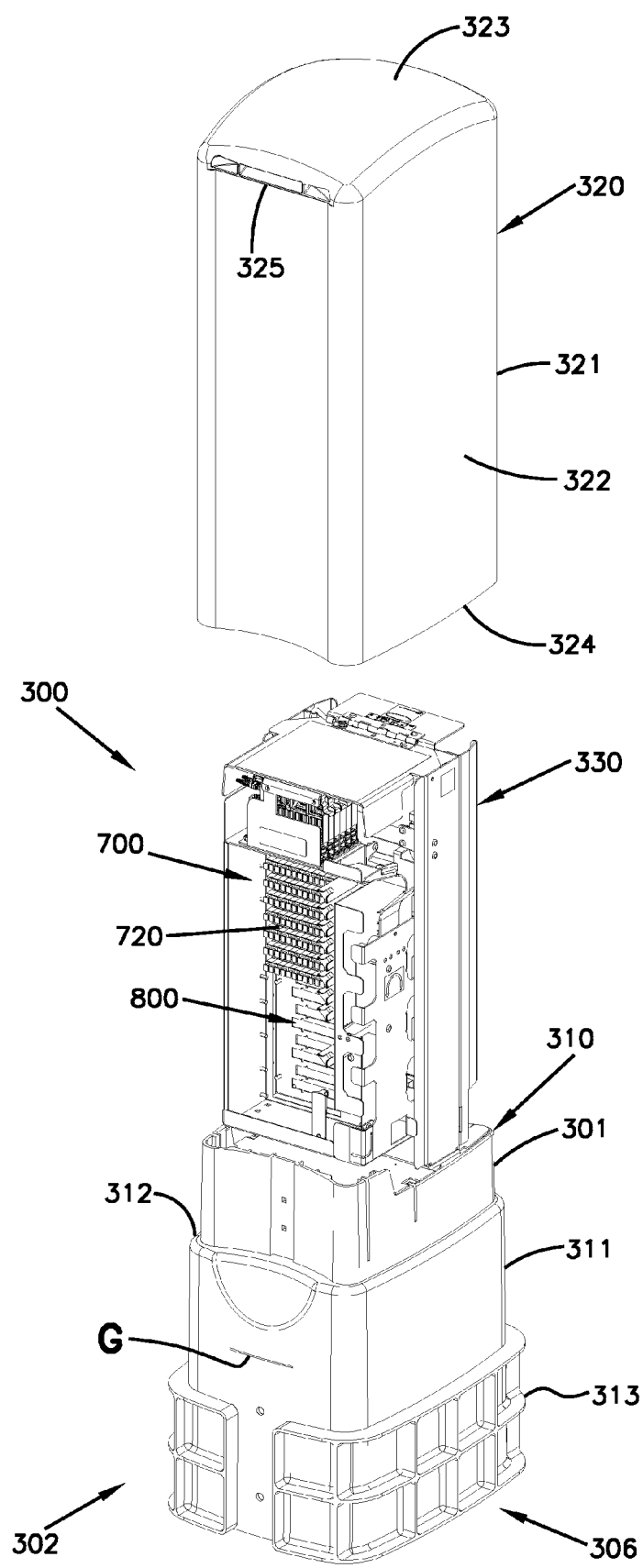
FIG. 3 is an exploded, front, perspective view of a pedestal terminal including a base, a frame, and a cover configured in accordance with the principles of the present disclosure.

FIG. 2 is a schematic representation of an example pedestal terminal 200 suitable for use as a fiber distribution terminal 103 in the telecommunications network 100 (FIG. 1). The pedestal terminal 200 includes a body 201. The body 201 defines a cable entrance/exit 205 through which one or more telecommunications cables can pass. In some embodiments, the body 201 defines a single opening as the cable entrance/exit 205 through which one or more fiber optic cables can extend. In one embodiment, the body 201 defines separate entrance and exit apertures.

One or more telecommunications components can be mounted to the body 201. In general, the body 201 defines a splitter region 220 at which an optical signal can be split into a plurality of optical signals, a termination region 230 at which connectorized ends of optical fibers can be optically coupled, and a cable management region 250 at which optical fibers and/or fiber optic cables can be organized and managed. In the example shown, the body 201 also includes an interface region 210, a storage region 240, and a drop region 260.

Figure 5:
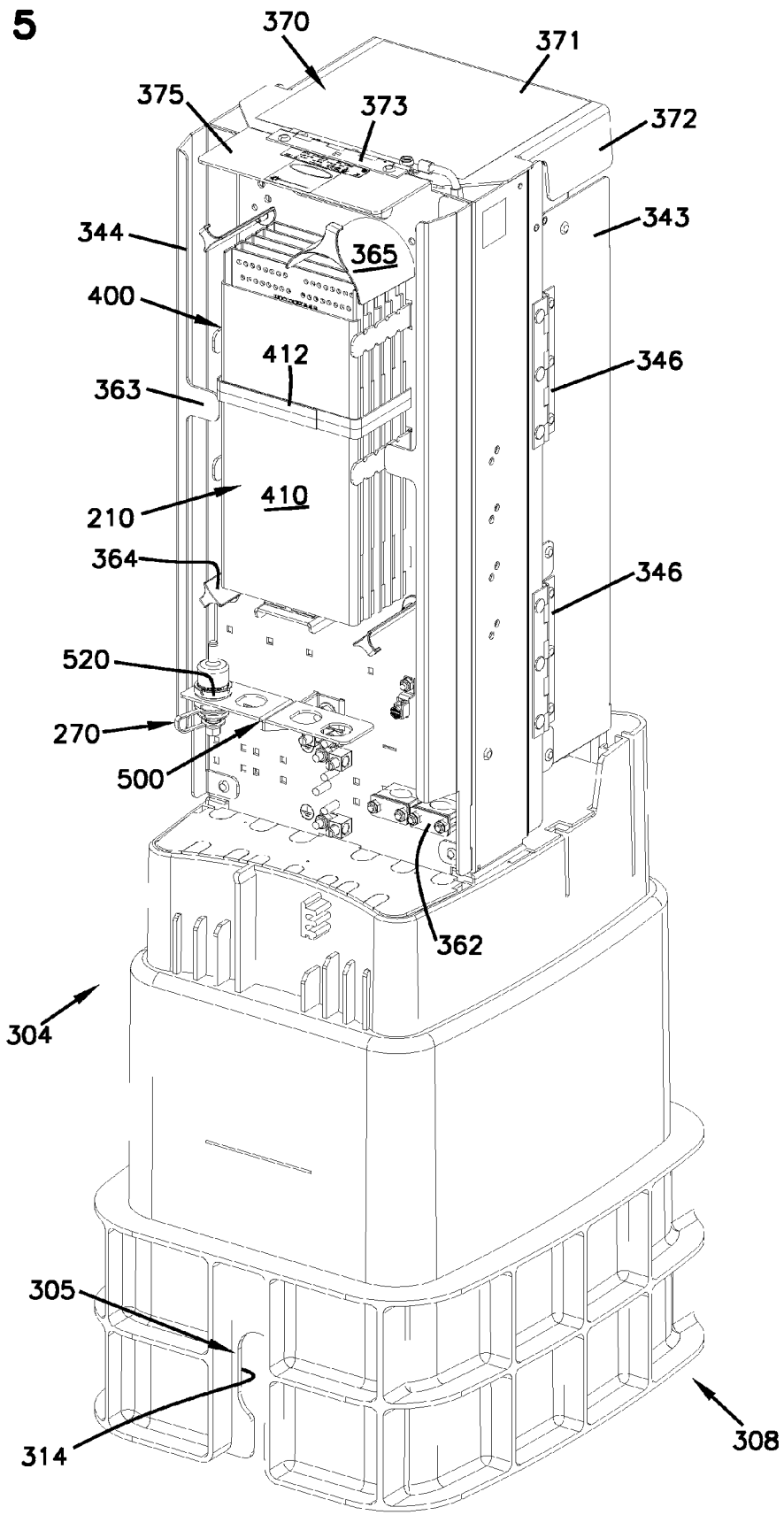
FIG. 5 is a rear, perspective view of the pedestal terminal of FIG. 4 with the swing portion of the frame moved into the closed position in accordance with the principles of the present disclosure.
Figure 6:
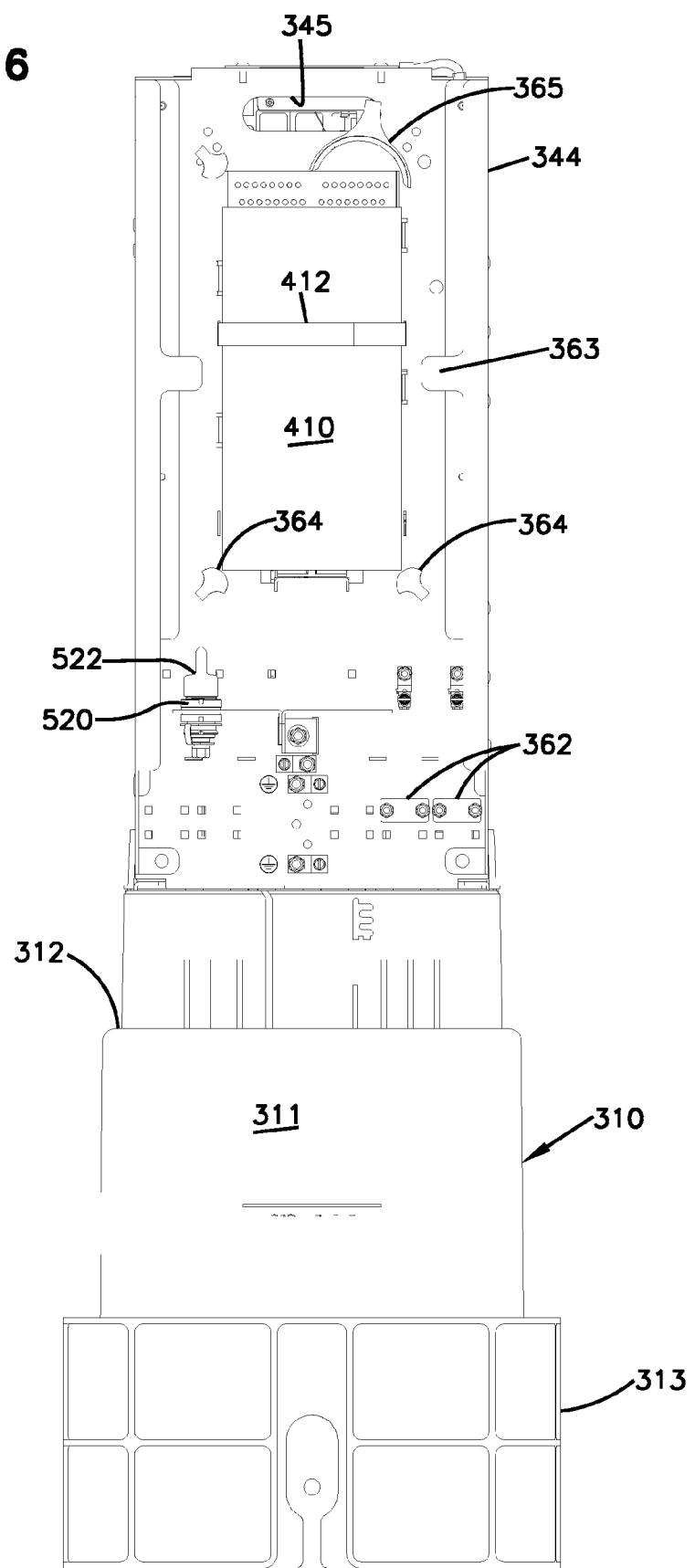
FIG. 6 is a rear view of the pedestal terminal of FIG. 5 in accordance with the principles of the present disclosure.

FIG. 2 also shows an example cable routing scheme for the pedestal terminal 200. A feeder cable 104 can be routed onto the body 201 through the cable entrance/exit 205 (e.g., typically through the back or bottom of the body 201 as shown in FIG. 5) and routed to the interface region 210. In certain embodiments, the fibers of the feeder cable 104 can include ribbon fibers or loose tube fibers. An example feeder cable 104 may include six to forty-eight individual fibers connected to a service provider central office 101 (FIG. 1). Other example feeders cables can include greater or fewer numbers of fibers, however.

Figure 7:
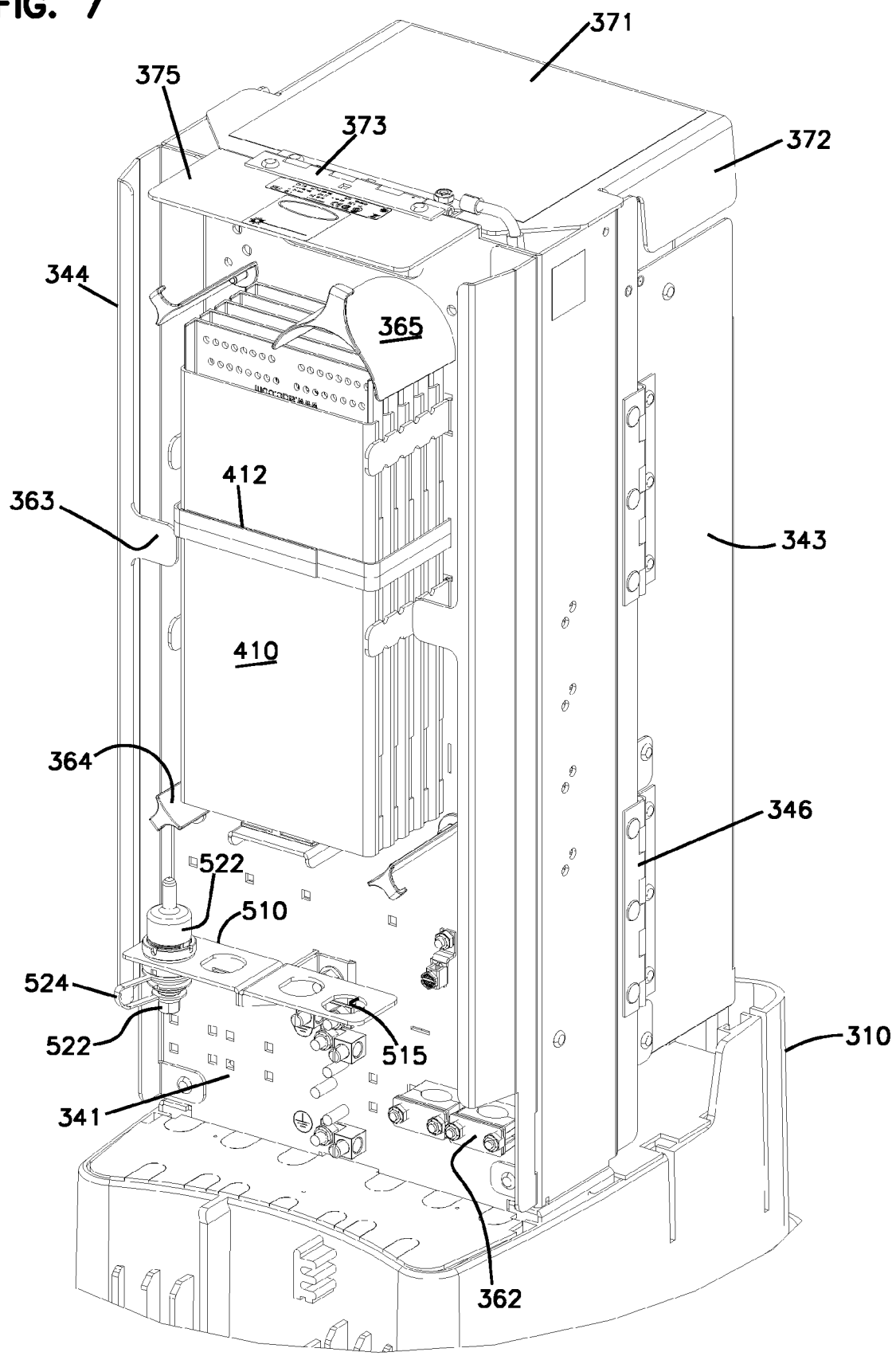
FIG. 7 is a partial, rear, perspective view of the pedestal terminal of FIG. 6 in accordance with the principles of the present disclosure.

At the interface region 210, the fibers of the feeder cable 104 can be optically coupled to splitter input fibers 110, which extend between the cable interface region 210 and the splitter region 220. In accordance with one aspect, one or more splice trays (see FIG. 7) can be mounted at the interface region 210 to connect fibers of the feeder cables 104 to the splitter input fibers 110. In one embodiment, each tray can provide space for up to seventy-two splices (e.g., two splices, twelve splices, twenty-four splices, forty-eight splices, etc.). In other embodiments, each tray can provide space for greater or fewer splices. In accordance with other aspects, one or more fiber optic adapters or adapter modules (not shown) can be mounted at the interface region 210 for connecting the feeder cable fibers with the splitter input fibers 110. The adapters can be configured to accommodate single fiber connectors or multi-fiber connectors.

In certain embodiments, the splitter input fibers 110 can be precabled between the interface region 210 and the splitter region 220. For example, in some embodiments, the splitter input fibers 110 include pigtails extending from the splitter region 220 and routed to the interface region 210 prior to deployment of the pedestal terminal 200. In other embodiments, connectorized ends of the splitter input fibers 110 can be interfaced with splitter modules in the splitter region via fiber optic adapters as will be disclosed in greater detail herein.

In accordance with still other aspects, the feeder cable fibers can bypass the interface region 210 and be routed directly to the splitter region 220. For example, connectorized ends of the feeder cable fibers can be interfaced with splitter modules at the splitter region 220 via fiber optic adapters. In accordance with one aspect, the fibers of the feeder cable 104 can be routed to cable fanouts (not shown) that separate the fibers of the feeder cable 104 prior to routing the separated fibers to the splitter region 220. The feeder cable 104 also can be routed to the cable fanouts prior to being routed to the interface region 210. The fanout device also can upjacket the fibers of the feeder cable 104.

At the splitter region 220, the splitter input fibers 110 (i.e., or feeder cable fibers) are connected to separate splitter modules 225, in which signals carried over the splitter input fibers 110 are each split into multiple signals carried over splitter pigtails 112. In accordance with certain aspects, each splitter pigtail 112 has a connectorized end 111. A typical splitter pigtail 112 includes a coated, and possibly buffered, fiber, a jacket covering the fiber, and strength members (e.g., aramid yarn) positioned between the fiber and the jacket. In other embodiments, however, the fibers of the feeder cable 104 can be routed directly to the splitter region 220 and interfaced with the splitter modules 225.

Figure 12:
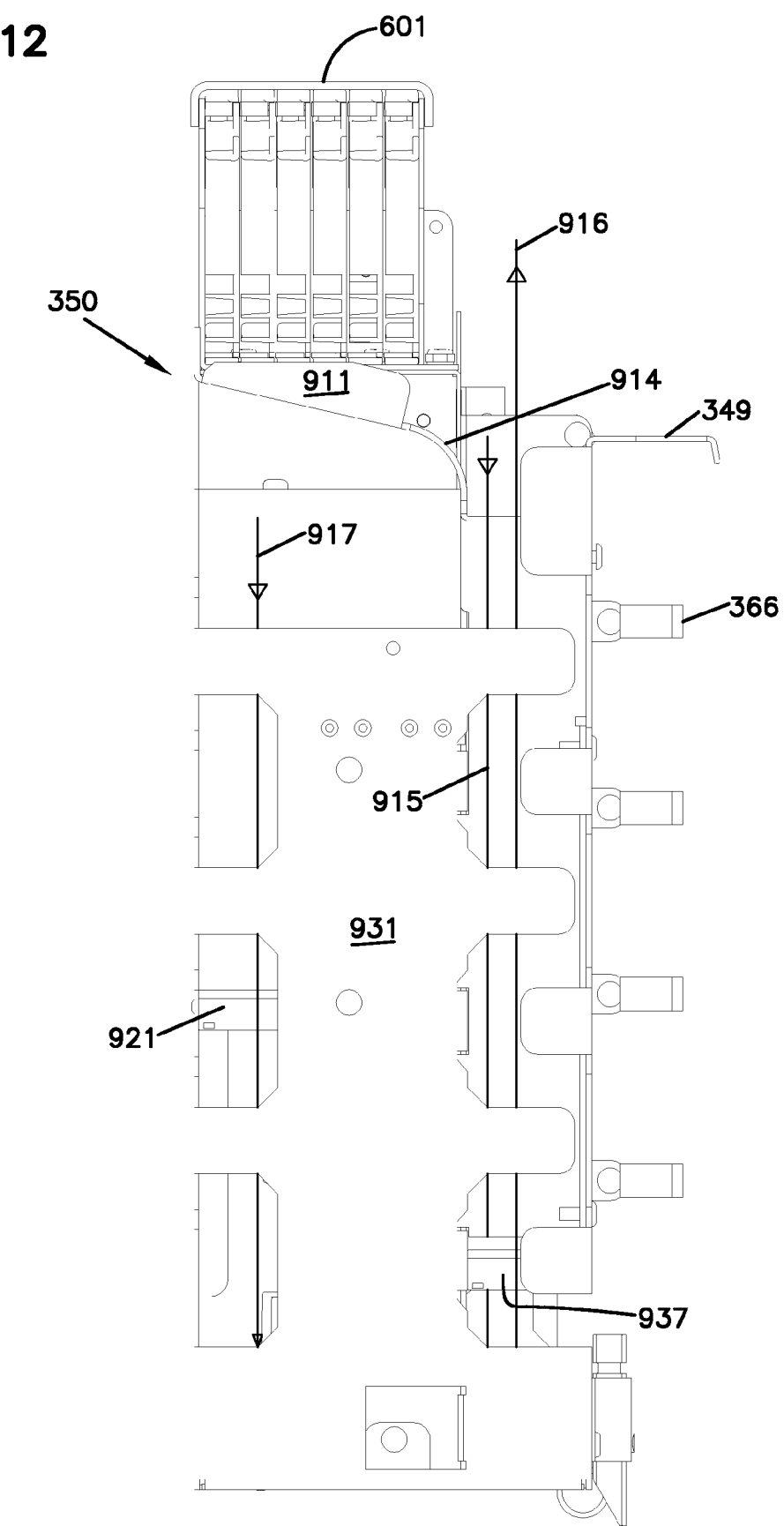
FIG. 12 is a first side elevational view of the pedestal terminal of FIG. 8 in accordance with the principles of the present disclosure.
Figure 13:
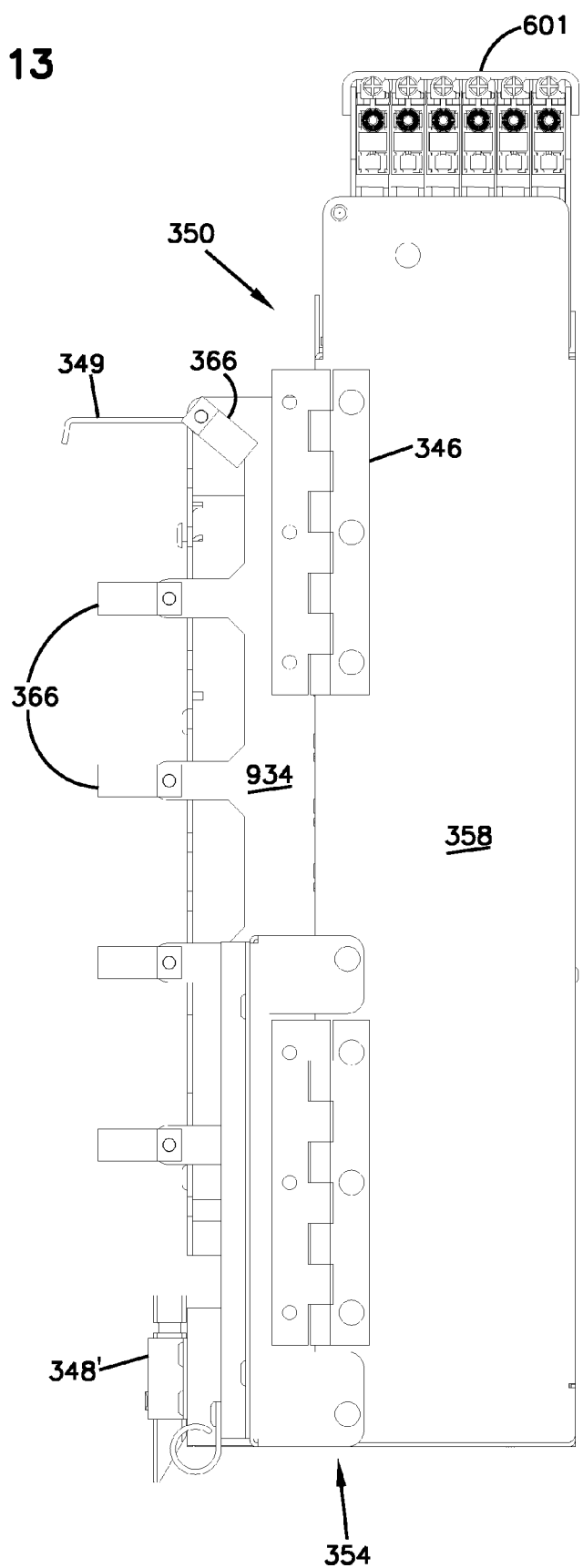
FIG. 13 is a second side elevational view of the pedestal terminal of FIG. 8 in accordance with the principles of the present disclosure.
Figure 14:
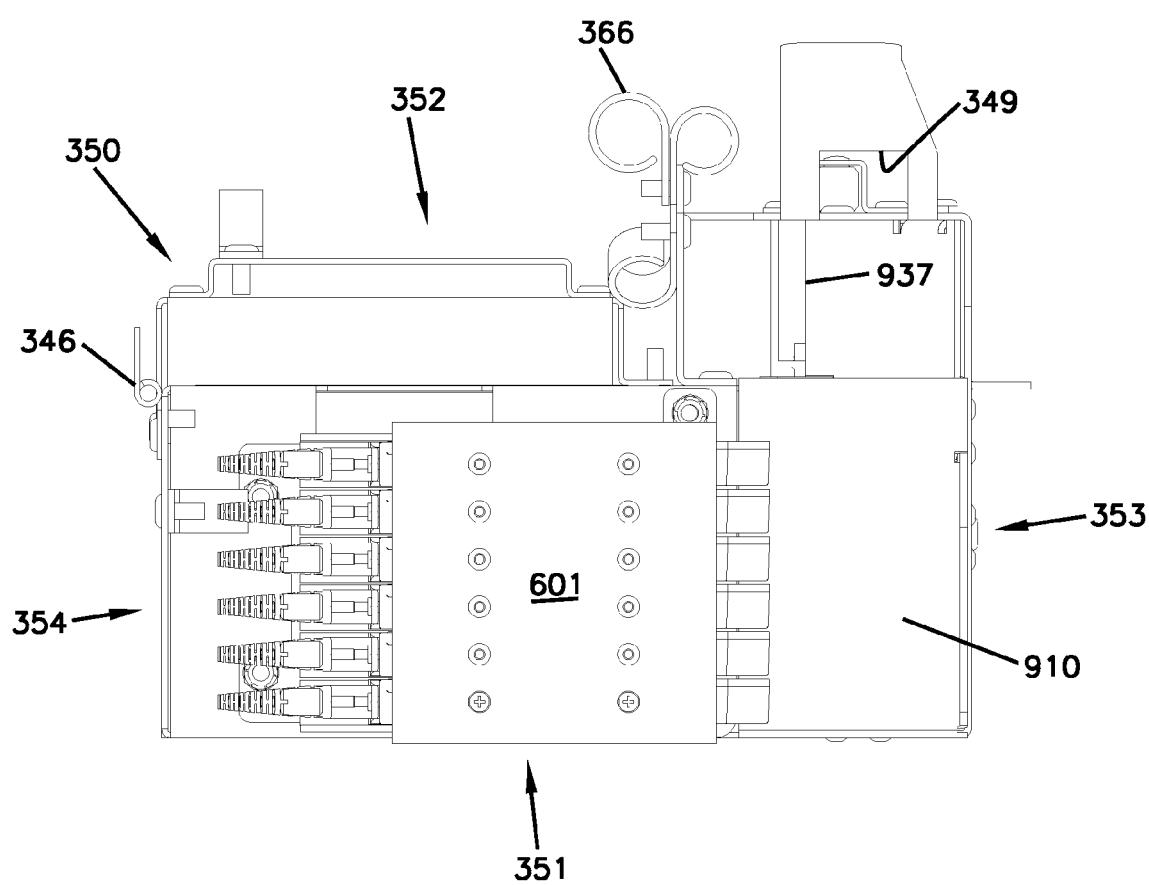
FIG. 14 is a top, plan view of the pedestal terminal of FIG. 8 in accordance with the principles of the present disclosure.

The splitter pigtails 112 can be organized at the management region 250. Generally, the management region 250 includes one or more bend radius limiters to protect the optical fibers against pulling or snapping. In accordance with some aspects, excess length of one or more of the splitter pigtails 112 can be stored within the management region 250. For example, the excess length can be stored within one or more fiber/cable spools (not shown). In other embodiments, the excess length can be routed through channels (e.g., see channels 916, 917 of FIG. 12).

In accordance with certain aspects of the disclosure, each splitter pigtail 112 is configured to optically couple to a distribution cable 106 or a drop cable 108. First splitter pigtails 112A, which are configured to optically couple to a distribution cable 106, can be routed to the first termination region 230. When the first splitter pigtails 112A are needed for service, the first pigtails 112A are routed from the splitter modules 225 to a termination module (e.g., adapter, adapter module, etc.) 235 that is provided at the termination region 230. At the termination region 230, the connectorized ends 111 of the first splitter pigtails 112A are optically coupled to connectorized ends 113 of subscriber fibers 114.

In accordance with some aspects, the connectorized ends 111 of the first splitter pigtails 112A can be temporarily stored on a storage module 245 that is mounted at the storage region 240 when the first splitter pigtails 112A are not in service. In accordance with certain aspects, the connectorized ends 111 of second splitter pigtails 112B, which are configured to optically couple to a drop cable 108, also can be stored at the storage region 240 when not in service. In accordance with other aspects, the connectorized ends 111 can be left loose or otherwise managed within the terminal 200 when not in service.

In accordance with some aspects, the subscriber fibers 114 are routed from the first termination region 230 back to the interface region 210. In accordance with one aspect, the subscriber fibers 114 are precabled within the pedestal terminal 200 to extend between the first termination region 230 and the interface region 210. At the interface region 210, the subscriber fibers 114 are optically spliced to a subscriber distribution cable 106 routed out of the terminal 200 through the cable entrance/exit 205. A typical distribution cable 106 typically includes a plurality of fibers (e.g., 12 fibers, 24 fibers, 36 fibers, 48 fibers, 60 fibers, 72 fibers, 96 fibers, etc.) that are routed from the fiber distribution terminal 103 and subscriber locations 109 (e.g., via drop terminals 105 of FIG. 1).

In accordance with other aspects, the subscriber fibers 114 can be terminated with one or more multi-termination connectors (i.e., multi-fiber connectors), which can be optically coupled to a subscriber cable terminated at a multi-termination connector. Further details regarding multi-fiber connector-terminated intermediate fibers can be found in copending U.S. application Ser. No. 11/513,910, filed Aug. 30, 3006 as "Fiber distribution hub with modular termination blocks," the disclosure of which is hereby incorporated herein by reference. In accordance with still other aspects, the subscriber fibers 114 can bypass the interface region 210 and instead be ribbonized at a fanout arrangement (not shown) to form one or more subscriber distribution cables 106.

In accordance with other aspects, second splitter pigtails 112B, which are configured to optically couple to drop cables 108, can be routed from the splitter module 225 to a termination device 265 at a second termination region 260. In accordance with some aspects, the termination device 265 includes one or more telecommunications adapters. In accordance with one aspect, each adapter 265 is configured to couple together a connectorized end 111 of the second splitter pigtail 112B and a connectorized end of a patch cable fiber 116.

In accordance with some aspects, the patch cable fibers 116 can be precabled between the second termination region 260 and a drop region 270. The drop region 270 includes at least one interface device 275. In accordance with some aspects, the interface device 275 is an adapter. In accordance with certain aspects, each adapter 275 is a ruggedized adapter that is configured to receive one or more ruggedized fiber optic connectors (e.g., ruggedized SC connectors). The adapters 275 optical couple together the patch cable fibers 116 and fibers of a drop cable 108.

For example, in accordance with one aspect, a connectorized end of a patch cable fiber 116 can be received within a first side of one of the adapter 275 at the drop region 270. A second side of the adapter 275 is configured to receive a fiber optic connector (e.g., a ruggedized connector) of a drop cable fiber 108 that is routed to the terminal 200. Accordingly, the patch cable fibers 116 optically connect the second splitter pigtails 112B to the drop cable fibers 108.

In accordance with other aspects, one or more fibers of the feeder cable 104 are not connected to any of the splitter modules 225. Rather, these fibers of the feeder cable 104 are connected through an interface device (e.g., splice tray, adapter module, etc.) at the interface region 210 to pass-through fibers (not shown) having connectorized ends. The connectorized ends of the pass-through fibers are connected to the connectorized ends 113 of the subscriber cable fibers 114 at the termination region 230 or to the connectorized ends of the drop cable 108 without first connecting to the splitter region 220. By refraining from splitting the signals carried over the fibers of feeder cable 104, a stronger signal can be sent to one of the subscribers 109. The connectorized ends of the pass-through fibers can be stored at the storage region 240 when not in use. In other embodiments, however, a feeder cable 104 having a connectorized end can be routed directly to the termination region 230 or drop region 260.

In general, the first termination region 230 and second termination region 260 of the pedestal terminal 200 provide an interconnect interface for optical transmission signals at a location in the network where operational access and reconfiguration are desired. For example, as noted above, the pedestal terminal 200 can be used to split the feeder cables 104 and terminate the split feeder cables 104 to distribution cables 106 or drop cables 108 routed to subscriber locations 109 (FIG. 1). In addition, the pedestal terminal 200 is designed to accommodate a range of alternative sizes and fiber counts and support factory installation of pigtails, fanouts, and splitters.

In the example shown, the splitter region 220 is located adjacent the top of the body 201 of the terminal 200. The first termination region 230 is located beneath the splitter region 220. The connector storage region 240 is positioned beneath the first termination region 230 on the body 201. In the example shown in FIGS. 9-11, the second termination region 260 is located above the first termination region 230 and below the splitter region 220. In other embodiments, however, the second termination region 260 can be located below or to a side of the first termination region 230. In accordance with certain aspects, one or more channels in the cable management region 250 can extend vertically along an end of the body 201. In accordance with other aspects, however, the telecommunication components can be mounted to the body 201 in different configurations.

In accordance with aspects of the disclosure, the body 201 includes a pivoting frame (i.e., a swing frame) mounted to a stationary support frame. In accordance with certain aspects of the disclosure, the swing frame can define the termination region 230 at which fiber optic adapters can be mounted. In accordance with some aspects, the swing frame also can define the splitter region 220, the storage region 240, and/or the cable management region 250. In accordance with some aspects, the interface region 210 can be provided on the swing frame. In accordance with other aspects, however, the interface region can be mounted to the support frame.

FIGS. 3-8 show various views of an example pedestal fiber distribution terminal 300 suitable for use in a telecommunications network, such as network 100 of FIG. 1. The pedestal fiber distribution terminal 300 includes a body 301 having a front 302 (FIG. 3), a rear 304 (FIG. 5), a first side 306 (FIG. 3), and a second side 308 (FIG. 5). The body 301 also defines a cable port 305 (see FIG. 5) through which fibers and/or cables can enter and/or exit the terminal 300. In the example shown, the body 301 includes a base 310, a cover 320 that couples to the base 310, and a frame 330 that is mounted to the base 310 and that is enclosed by the cover 320.

The base 310 includes a body 311 that is configured to support the cover 320. In the example shown, the base body 311 defines an upwardly facing shoulder 312 on which the cover 320 can seat. The base body 311 also is configured to be buried at least partially underground. In the example shown, the base body 311 is configured to be buried to a ground level line G (see FIGS. 3-4). A reinforcing structure 313 can be provided on the base body 311, e.g., on the portions to be buried. The base body 311 also can define an opening 314 forming a cable entrance/exit port 305 for the body 301.

The cover 320 includes a body 321 that is configured to enclose and protect telecommunications components mounted within the pedestal terminal 300. The cover body 321 defines a generally hollow interior defined by a side wall 322 and closed off by an end wall 323. An edge 324 of the side wall 322 opposite the end wall 323 defines an opening to the interior. The edge 324 is configured to seat on the shoulder 312 of the base 310. In the example shown, the end wall 323 defines a curved surface. In accordance with certain aspects, the cover 320 can define a vent 325. In the example shown, the vent 325 is positioned adjacent the end wall 323.

The frame 330, which will be discussed in greater detail with respect to FIGS. 9-14, provides support for telecommunications components mounted on the pedestal fiber distribution terminal 300. The frame 330 includes a support frame 340 mounted to the base 310 and a pivotal frame (i.e., a swing frame) 350 mounted to the support frame 340 (see FIG. 4). When the cover 320 is positioned on the base 310, a top of the frame 330 passes through the opening defined by the edge 324 of the cover 320 to be received within the interior of the cover 320.

The support frame 340 includes a panel (or bulkhead) 341 that is secured to the base 310 via attachment members 342. The panel 341 extends between the first and second sides 306, 308 of the terminal body 301. A first set of side panels 343 extend forwardly from either side of the panel 341 to define a forward section of the support frame 340 and a second set of side panels 344 extend rearwardly from either side of the panel 341 to define a rearward section of the support frame 340. The panel 341 defines at least one opening 345 that is configured to enable fibers and/or cables to pass through the panel 341 from the rearward section of the support frame 340 to the forward section.

Figure 4:
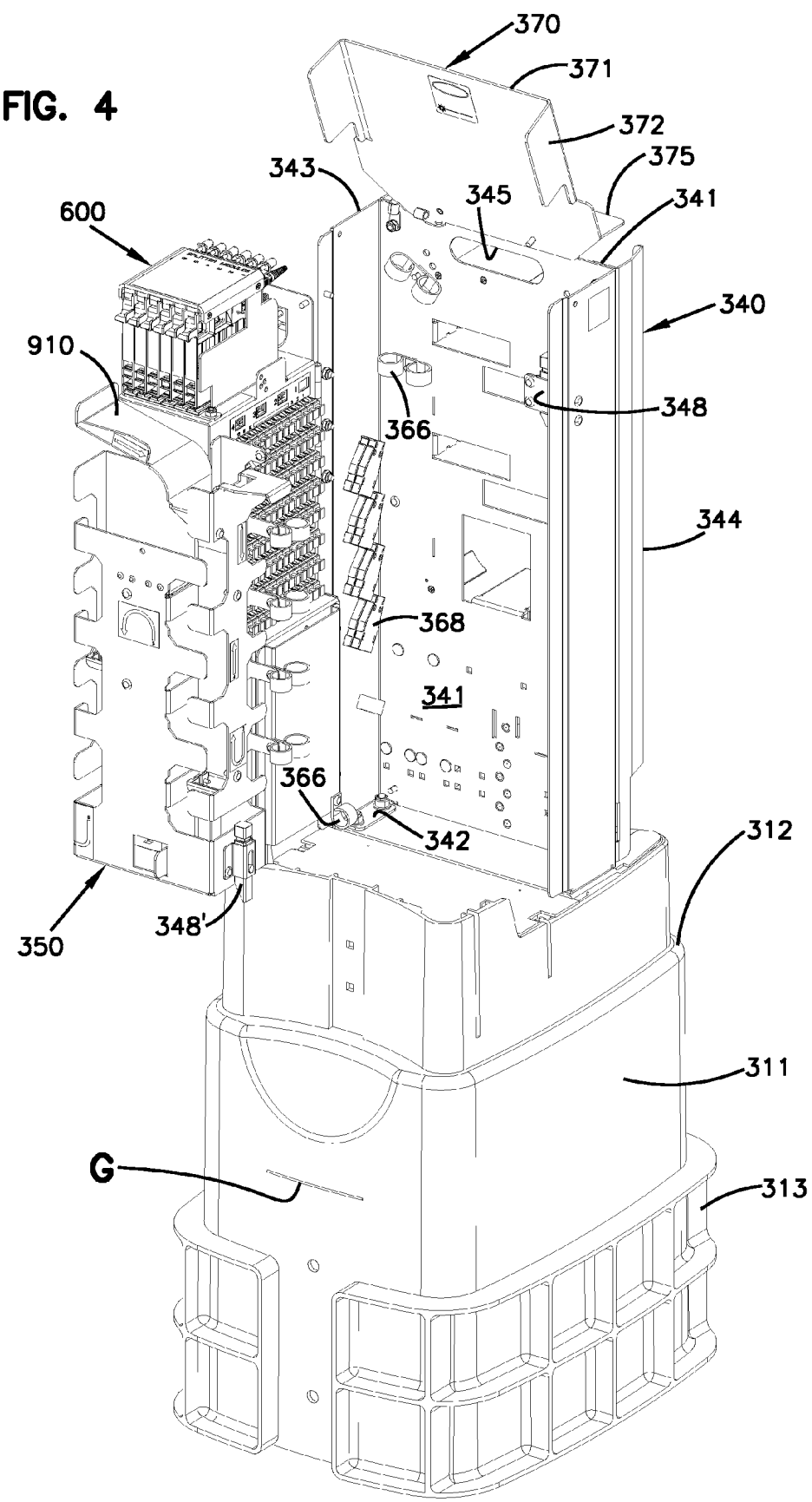
FIG. 4 is a front, perspective view of the pedestal terminal of FIG. 3 with the cover removed and a swinging portion of the frame moved into an open position in accordance with the principles of the present disclosure.

The swing frame 350 is configured to be pivoted between a first position in which the swing frame 350 is arranged within the forward section of the support frame 340 (see FIG. 3) and a second position in which the swing frame 350 is pivoted outwardly from the support frame 340 such that the front of the support frame 340 is accessible (see FIG. 4). The front of the support frame 340 is not accessible when the swing frame 350 is arranged in the first position (see FIG. 3). The swing frame 350 is arranged wholly within a footprint of the base 310 when the swing frame 350 is arranged in the first position.

As shown in FIGS. 4 and 5, the swing frame 350 can be pivotally mounted to the support frame 340 using one or more hinges 346. In accordance with certain aspects, one end of the swing frame 350 can be pivotally coupled to one of the side panels 343 of the support frame 340 using vertically extending hinges 346. In accordance with one aspect, the hinges 346 define a vertical hinge axis $A_S$ located adjacent a second side 336 of the pedestal 300 (see FIGS. 4 and 5). In accordance with some aspects, the swing frame 350 can be releasably held in the closed position using latch 348 (FIG. 4). In the example shown, the latch 348 is mounted to the support frame 340 and is configured to engage a latching opening 349 defined by the swing frame 350. The swing frame 350 also can include a second latch 348' that selectively inhibits pivoting the swing frame 350 to the closed position (see FIG. 4).

A number of telecommunications components can be mounted to the support frame 340 and to the swing frame 350. In accordance with aspects of the disclosure, an interface arrangement 400 and a drop arrangement 500 are mounted to the support frame 340. In accordance with aspects, a splitter arrangement 600, a termination arrangement 700, a storage arrangement 800, and a management arrangement 900 can be mounted to the swing frame 350. In accordance with other aspects, however, the components can be positioned in a different configuration.

A pivoting cover 370 also can be mounted to the support frame 340 (e.g., using one or more hinges 373). The pivoting cover 370 includes a forward member 371 that extends forwardly from the support panel 341 to cover the forward section of the support frame 340. In the example shown, the forward member 371 is defined by a panel from which tabs 372 are bent downwardly. The forward member 371 is configured to protect the splitter arrangement 600 when removing the cover 320 from the base 310 of the pedestal 300 and when placing the cover 320 on the base 310. More specifically, the forward member 371 inhibits an edge of the cover 320 from hitting or otherwise damaging the splitter arrangement 600. The forward member 371 is configured to pivot upwardly so as not to interfere with accessing the splitter arrangement 600 when the cover 320 has been removed from the base 310.

The pivoting cover 370 also includes a rearward member 375 that extends rearwardly from the support panel 341 to cover the rearward section of the support frame 340. In the example shown, the rearward member 375 is defined by a panel. The rearward member 375 provides protection for the interface arrangement 400 (e.g., one or more splice trays) mounted to the support frame 340. In certain embodiments, the rearward member 375 also provides protection for fibers routed around the rear side of the support frame 340. In one embodiment, the rearward member 375 is fixed relative to the support frame 340. In another embodiment, the rearward member 375 also is configured to pivot upwardly to provide (i.e., or at least not inhibit) access to the support frame 340 (e.g., to the interface arrangement 400) when the cover 320 is removed from the base 310.

In accordance with certain aspects, at least one feeder cable is routed from the cable port 305 to the support frame 340 during or subsequent to deployment of the terminal 300. The feeder cable fibers can be routed to the interface arrangement 400. One or more distribution cables 106 and/or one or more drop cables 108 also can be routed from the cable port 305 to the support frame 340 during or subsequent to deployment of the terminal 300. Distribution cables are routed to the interface arrangement 400. Drop cables 108 are routed to the drop arrangement 500. In accordance with other aspects, however, stub cables (not shown) can be precabled from the interface arrangement 400 and/or drop arrangement 500 out of the pedestal terminal 300. The stub cables can be optically coupled (e.g., spliced, connected at adapters, etc.) with feeder cables 104, distribution cables 106, and/or drop cables 108 during or subsequent to deployment of the terminal 300.

Cable clamps 362 (see FIGS. 5-7) can be provided on the support panel 341 to facilitate securing the incoming and outgoing fibers (e.g., feeder cable fibers, distribution cable fibers, drop cable fibers, etc.). For example, a jacket of an incoming or outgoing cable can be clamped to the support panel 341. Strength members of the cable also can be secured to or adjacent the clamps 362. In one embodiment, the feeder cables 104 are routed to a central portion of the support panel 341 and the distribution cables 106 are routed to one or both sides of the support panel 341. Cable clamps 362 are positioned accordingly. In other embodiments, however, the cable clamps 362 can be positioned in other locations on the support frame 340 or the base 310.

The feeder cable fibers are routed to the interface arrangement 400 during or subsequent to deployment of the pedestal terminal 300. In some embodiments, the interface arrangement 400 is positioned on a rear side of the support frame 340. In other embodiments, however, the interface arrangement 400 can be positioned elsewhere on the support frame 340, swing frame 350, or base 310. In accordance with some aspects, the interface arrangement 400 includes one or more splice trays 410 secured with a strap 412. Each tray 410 is configured to connect (i.e., fuse) one or more of the feeder cable fibers to one or more splitter input fibers 110. In accordance with other aspects, however, the interface arrangement 400 can include one or more telecommunications adapters or adapter modules configured to interface feeder cable fibers and splitter input fibers. In accordance with one aspect, the adapter modules can be sliding adapter modules as disclosed in commonly assigned U.S. Pat. Nos. 5,497,444; 5,717,810; 6,591,051; and 7,416,349, the disclosures of which are incorporated herein by reference.

In accordance with aspects of the disclosure, one or more distribution cables 106 can be routed to the interface arrangement 400 during or subsequent to deployment of the pedestal terminal 300. For example, one or more distribution cable fibers can be routed to one or more splice trays 410 to connect the distribution cable fibers 106 to distribution fibers 114. In certain embodiments, the interface arrangement 400 includes a first splice tray at which feeder cable fibers 104 are coupled to splitter input fibers 110 and two or more splice trays at which distribution fibers 114 are coupled to a distribution cable 106. In accordance with other aspects, the splice trays 410 can optically couple the distribution fibers 114 to stub cable fibers (not shown) prior to deployment as discussed above.

In accordance with aspects of the disclosure, one or more of the drop cables 108 can be routed to the drop arrangement 500. In some embodiments, the drop arrangement 500 is positioned on the rear side of the support frame 340. The drop arrangement 500 includes at least one adapter 520 mounted to a support member 510. The adapters 520 are configured to optically couple the drop cable fibers 108 to fibers of a patch cable or to splitter pigtails as will be described in greater detail herein. Each support member 510 defines one or more openings 515 configured to receive the adapters 520. In the example shown in FIGS. 5-7, the drop arrangement 500 includes two support members 510 each defining two openings 515.

In accordance with some aspects, drop cables 108 can be routed to the drop arrangement 500 during or subsequent to deployment of the pedestal terminal 300. For example, the adapters 520 can be configured to receive connectorized ends of drop cables 108 during or subsequent to deployment. In accordance with other aspects, the adapters 520 can be pre-cabled to stub cables (not shown) that can be optically coupled to drop cables 108 during or subsequent to deployment. In some embodiments, unused adapters 520 (or adapters having one or more empty ports) retain dust caps 522 in unused ports to protect the adapters 520 from contamination. In one example embodiment, the dust caps 522 of each adapter 520 are secured to the adapter 520 with a strap 524 (see FIG. 7).

Figure 21:
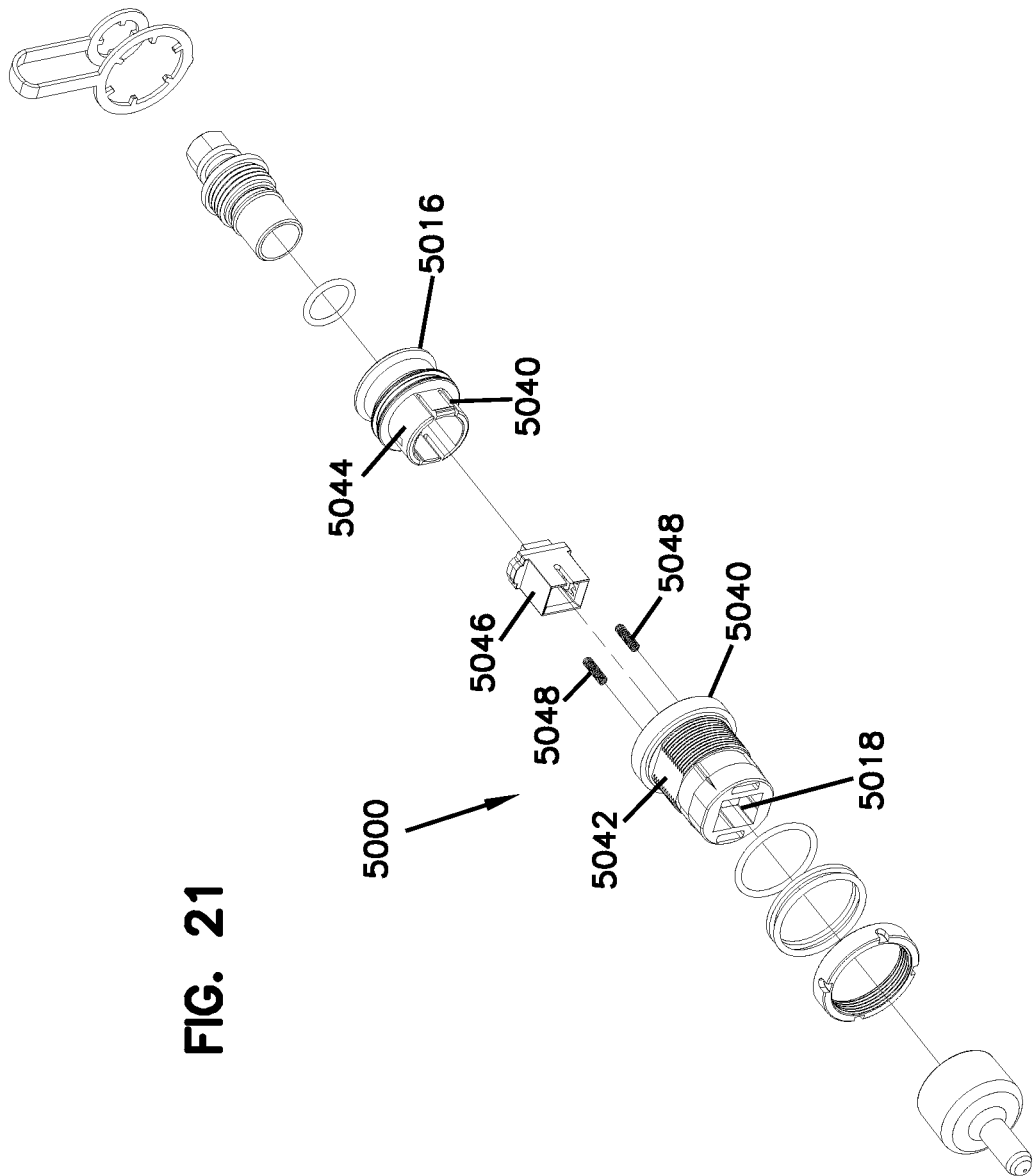
FIG. 21 is an exploded view of a fiber optic adapter suitable for use with a drop arrangement mounted within the pedestal terminal of FIG. 3 in accordance with the principles of the present disclosure.

In certain embodiments, the adapters 520 are ruggedized adapters. FIG. 21 illustrates one example ruggedized fiber optic adapter 5000. The fiber optic adapter 5000 includes a main housing 5040 having a first piece 5042 that defines the inner port 5018 of the fiber optic adapter 5000 and a second piece 5044 that defines an outer port 5016 of the fiber optic adapter 5000. The first and second pieces 5042, 5044 can be interconnected by a snap-fit connection to form the main housing 5040. A split sleeve housing 5046 mounts within the interior of the main housing 5040. Springs 5048 bias the split sleeve housing 5046 toward the outer port 5016 and allow the split sleeve housing 5046 to float within the interior of the main housing 5040.

Figure 22:
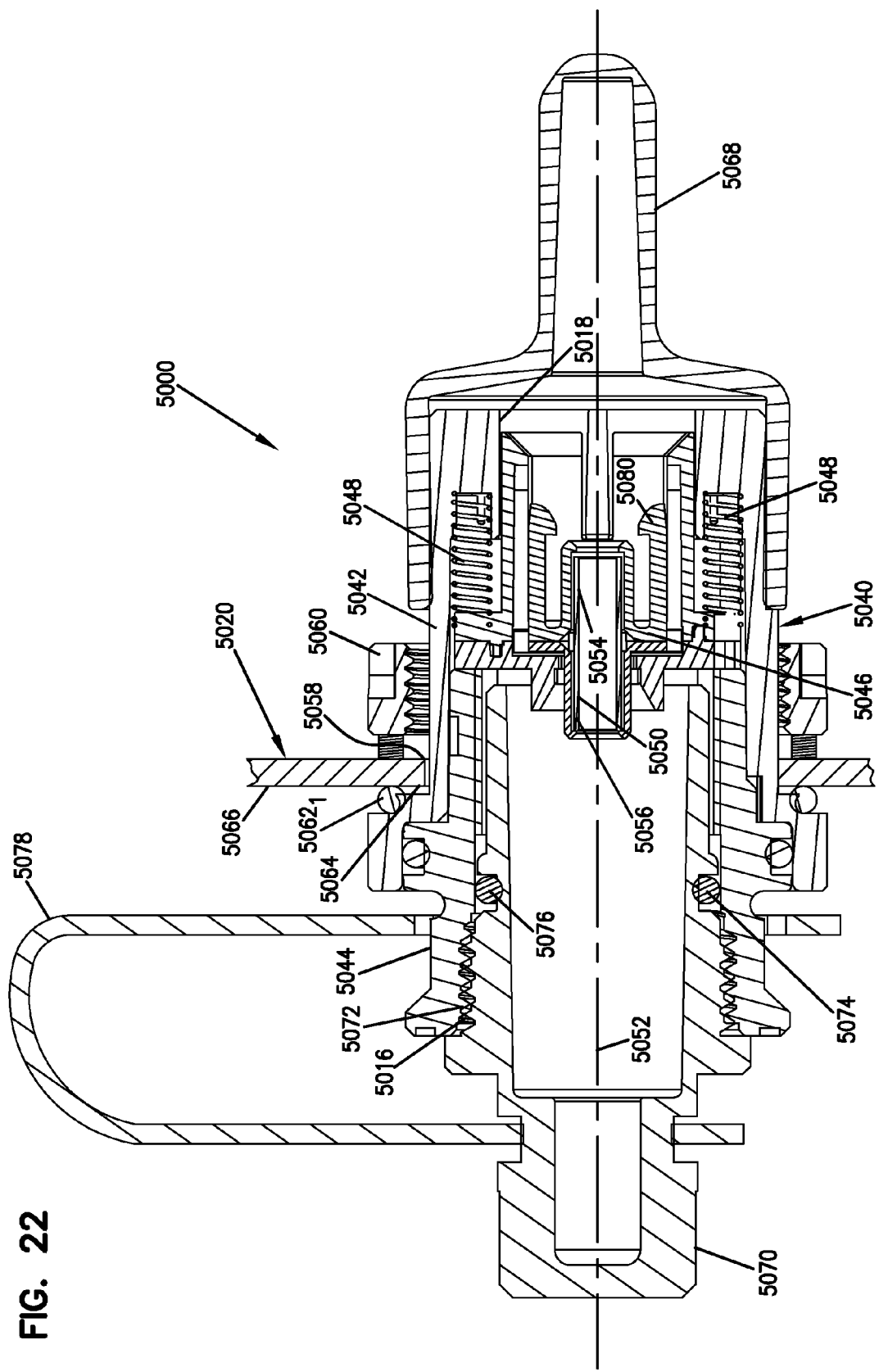
FIG. 22 is a longitudinal cross-sectional view of the fiber optic adapter of FIG. 21.

As shown in FIG. 22, the split sleeve housing 5046 houses a standard split sleeve 5050 that is coaxially aligned with a center axis 5052 of the fiber optic adapter 5000. The split sleeve 5050 includes a first end 5054 that faces toward the inner port 5018 of the fiber optic adapter 5000 and a second end 5056 that faces toward the outer port 5016 of the fiber optic adapter 5000. The fiber optic adapter 5000 mounts within one of the adapter mounting openings 515 defined in the support member 510. In some embodiments, the fiber optic adapter 5000 is retained within the adapter mounting opening 515 by a retention nut 5060 threaded on exterior threads defined by the first piece 5042 of the main housing 5040. When the retention nut 5060 is threaded into place, the plate 510 is captured between the retention nut 5060 and a shoulder 5064 of the main housing 5040. A sealing member 5066 is compressed between the main housing 5040 and the plate 510 to provide an environmental seal about the adapter mounting opening 515.

As shown in FIG. 22, an example dust cap 5068 is shown mounted covering the inner port 5018 of the fiber optic adapter 5000 and a plug 5070 is shown mounted within the outer port 5016 of the fiber optic adapter 5000. The plug 5070 is threaded within internal threads 5072 defined within the outer port 5016. The plug 5070 also includes a sealing member 5074 (e.g., an O-ring) that engages a sealing surface 5076 within the outer port 5016 to provide an environmental seal between the main housing 5040 and the plug 5070. A strap 5078 secures the plug 5070 to the main housing 5040 to prevent the plug from being misplaced when removed from the outer port 5016.

During or subsequent to installation of the fiber optic adapters 5000, the dust caps 5068 can be removed to allow the fiber optic connectors terminating the patch cable fibers 116 (or pigtail fibers 112) to be inserted into the inner ports 5018. When the fiber optic connectors are inserted into the inner ports 5018, ferrules of the inner fiber optic connectors are received within the first ends 5054 of the split sleeves 5050, and clips 5080 function to retain the inner fiber optic connectors within the inner ports 5018.

Figure 23:
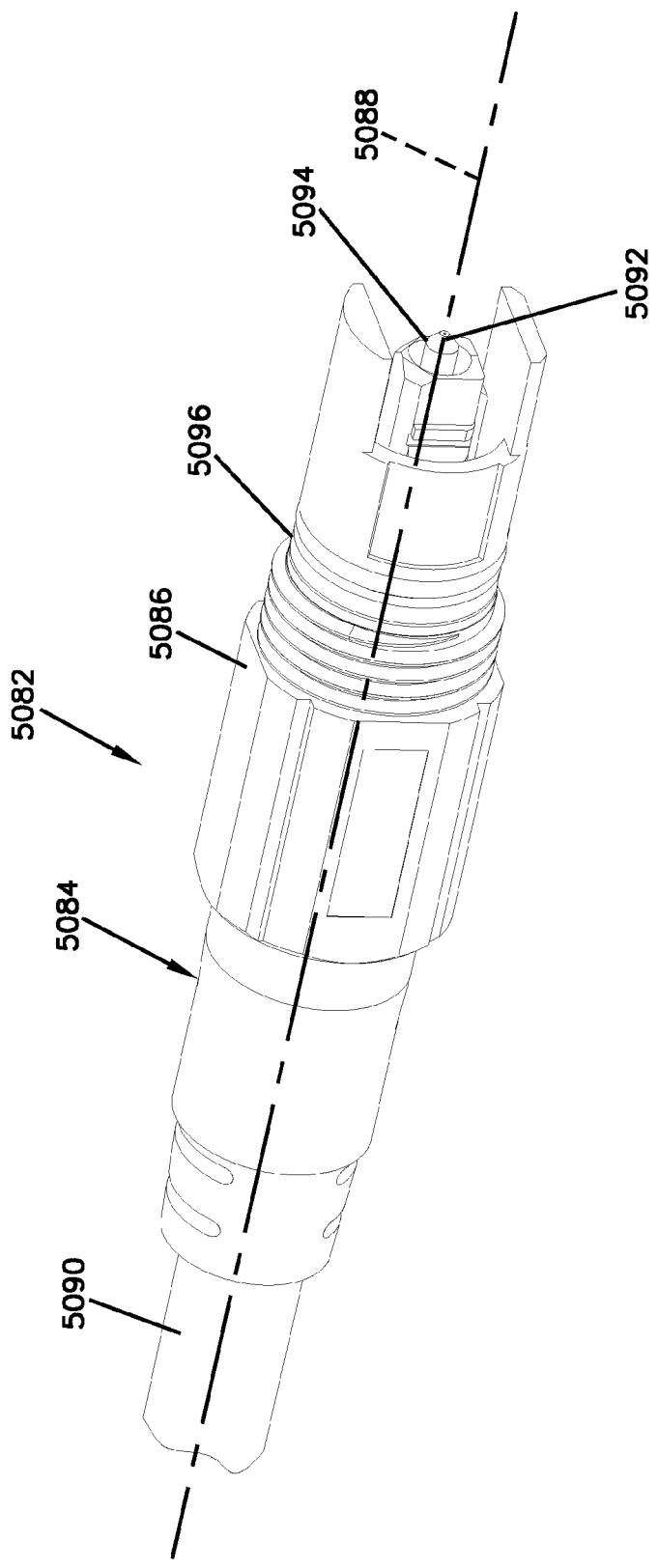
FIG. 23 shows a fiber optic connector adapted to be inserted in an outer port of the fiber optic adapter of FIGS. 21 and 22.

When it is desired to optically couple a drop cable 108 to one of the patch cable fibers 116 (i.e., to optically connect a pigtail 112 to the drop cable 108), the plug 5070 of one of the fiber optic adapters 5000 is removed from its corresponding outer port 5016 to allow an exterior fiber optic connector terminated to the drop cable 108 to be inserted into the outer port 5016. An example exterior fiber optic connector 5082 mounted at the end of an example drop cable 5090 is shown at FIG. 23. The exterior fiber optic connector 5082 includes a housing 5084 on which a retention nut 5086 is rotatably mounted. The retention nut 5086 can be manually rotated about a central axis 5088 of the exterior fiber optic connector 5082.

As shown in FIG. 23, the example drop cable 5090 includes an optical fiber 5092 having an end portion mounted within a ferrule 5094 supported at one end of the housing 5084. When the exterior fiber optic connector 5082 is inserted within the outer port 5016, the ferrule 5094 is received within second end 5056 of the split sleeve 5050. In this way, the split sleeve 5050 holds the ferrule of the patch cable fiber optic connector in coaxial alignment with the ferrule 5094 of the exterior fiber optic connector 5082. By aligning the ferrules, the corresponding optical fibers 116, 5092 held within the ferrules are placed in coaxial alignment thereby allowing light signals to be transferred from fiber to fiber.

The exterior fiber optic connector 5082 is retained within the outer port 5016 by threading the retention nut 5086 into the internal threads 5072. Additionally, the exterior fiber optic connector 5082 includes a sealing member 5096 (e.g., an O-ring) that engages the sealing surface 5076 to provide an environmental seal between the exterior fiber optic connector 5082 and the fiber optic adapter 5000. With the ends of the optical fibers 116, 5092 aligned, fiber optic signals can readily be transmitted between the optical fibers 116, 5092.

Cable routing structures can be provided on the support frame 340 to aid in routing the feeder cable fibers 104 and the distribution cable fibers 106 from the cable clamps 362 to the interface arrangement 400. For example, tabs 363 and spools 365 can aid in routing the cable fibers to the interface arrangement 400. The tabs 363 can be provided on side panels 344 to define vertically-extending routing channels along the support panel 341. Partial and/or full fiber spools 365 also can be provided on the support frame 340. In the example shown, a partial spool 365 is positioned on the rear side of the support panel 341 adjacent the opening 345 defined in the support panel 341. In addition, bend radius limiters 364 can be positioned on the rear side of the support panel 341 to facilitate fiber/cable routing. For example, bend radius limiters 364 can be positioned around the interface arrangement 400 positioned on the support panel 341. In the example shown in FIG. 6, bend radius limiters 364 are provided at corners of the splice trays 410.

The cable routing structures also can facilitate routing the splitter input fibers 110 (i.e., or feeder cable fibers), the distribution fibers 114, and the patch cable fibers 116 from the rearward portion of the support frame 340 to the forward portion of the support frame 340. For example, the partial fiber spool 365 can aid in routing the splitter input fibers 110, the distribution fibers 114, and the patch cable fibers 116 through the opening 345 defined in the support panel 341. Fiber tie-downs 366 can be positioned along the front side of the support panel 341 to further secure the fibers 110, 114 to the support panel 341. One or more fanout devices 368 also can be arranged within the forward portion of the support frame 340. The fanout devices 368 ribbonize and/or upjacket the distribution fibers 114 and patch cable fibers 116 routed from the swing frame 350, up the forward portion of the support frame 340, to the rearward portion of the support frame 340.

Figure 8:
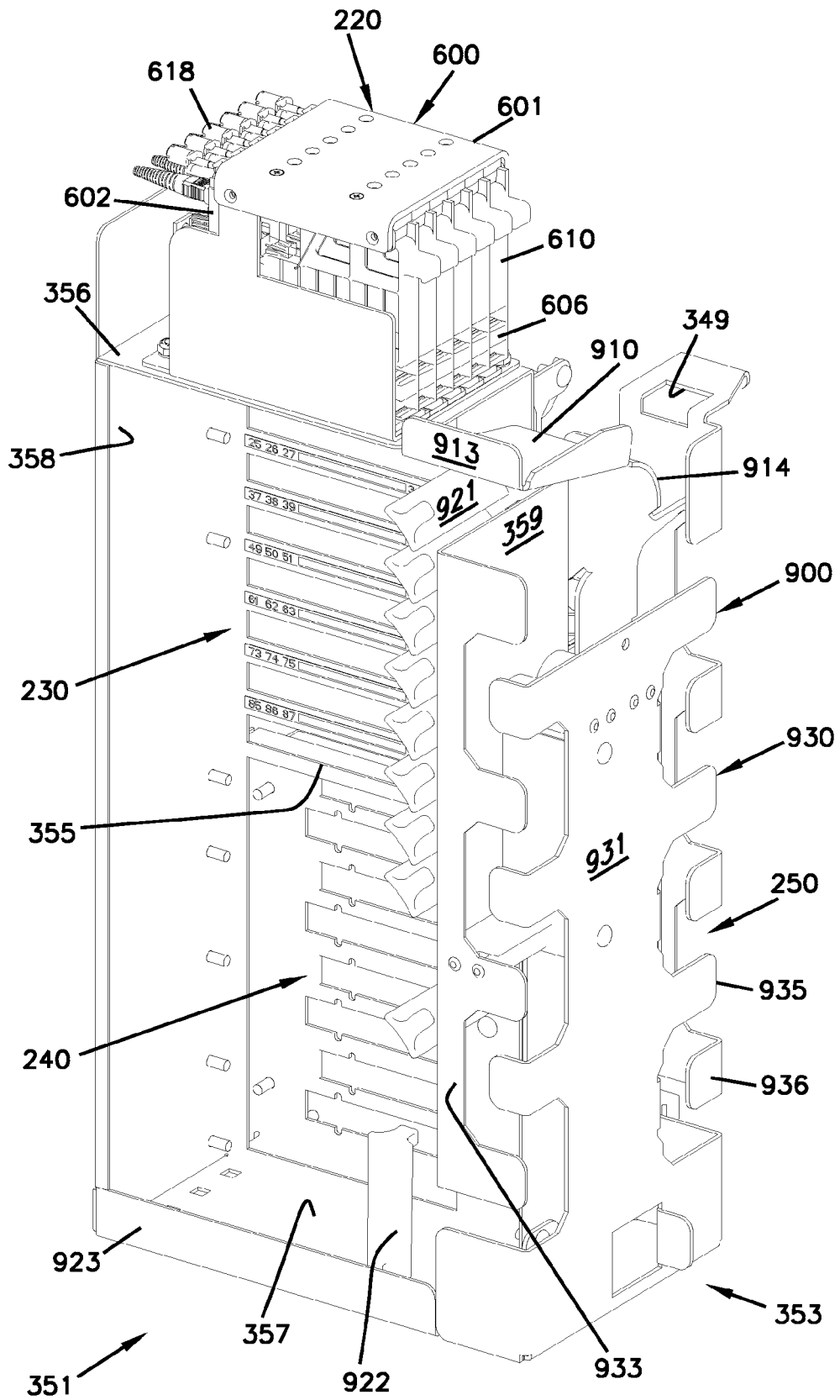
FIG. 8 is a front, perspective view of the swinging portion of the frame of the pedestal of FIG. 3 with the optical components removed in accordance with the principles of the present disclosure.
Figure 9:
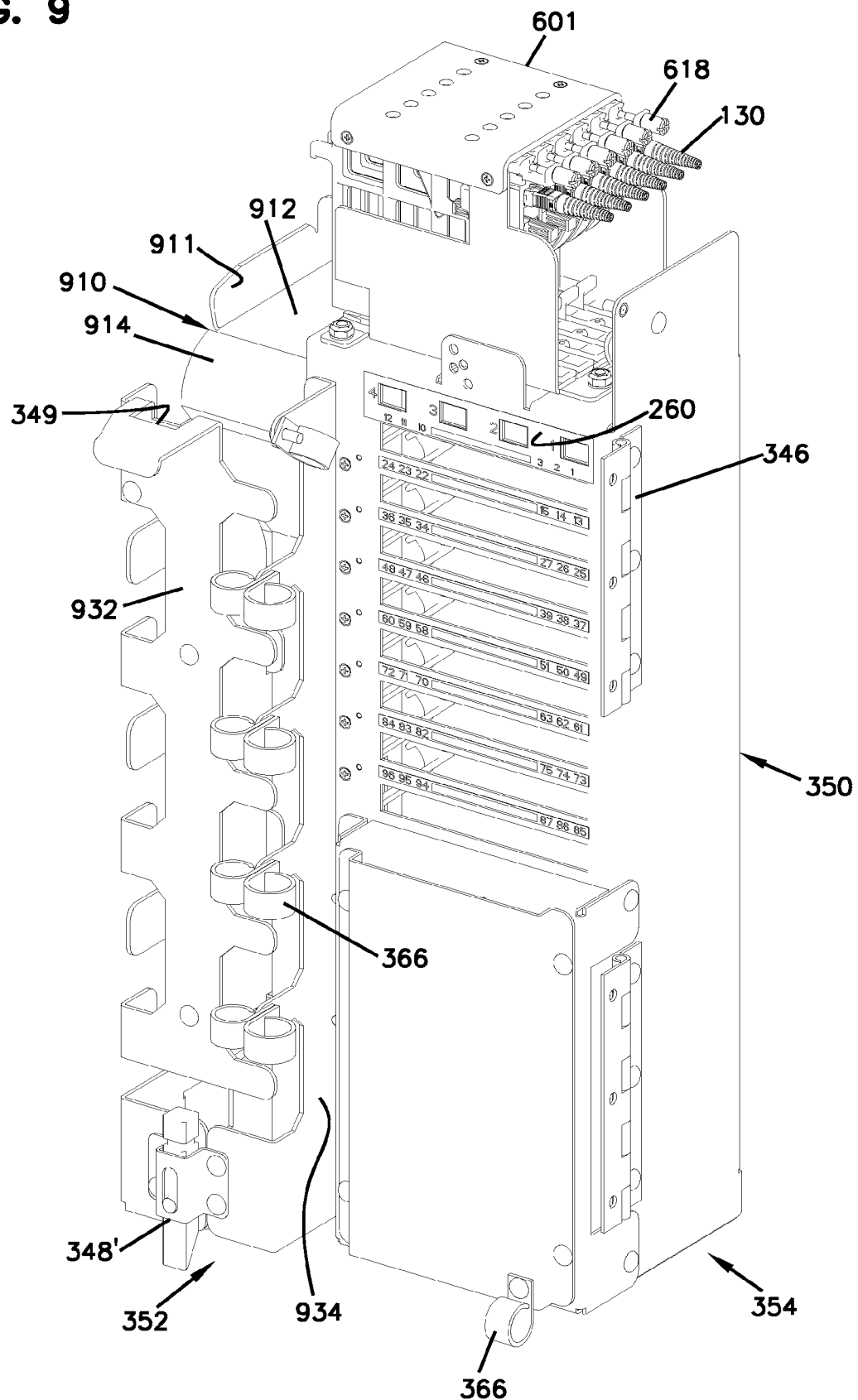
FIG. 9 is a rear, perspective view of the pedestal terminal of FIG. 8 in accordance with the principles of the present disclosure.
Figure 10:
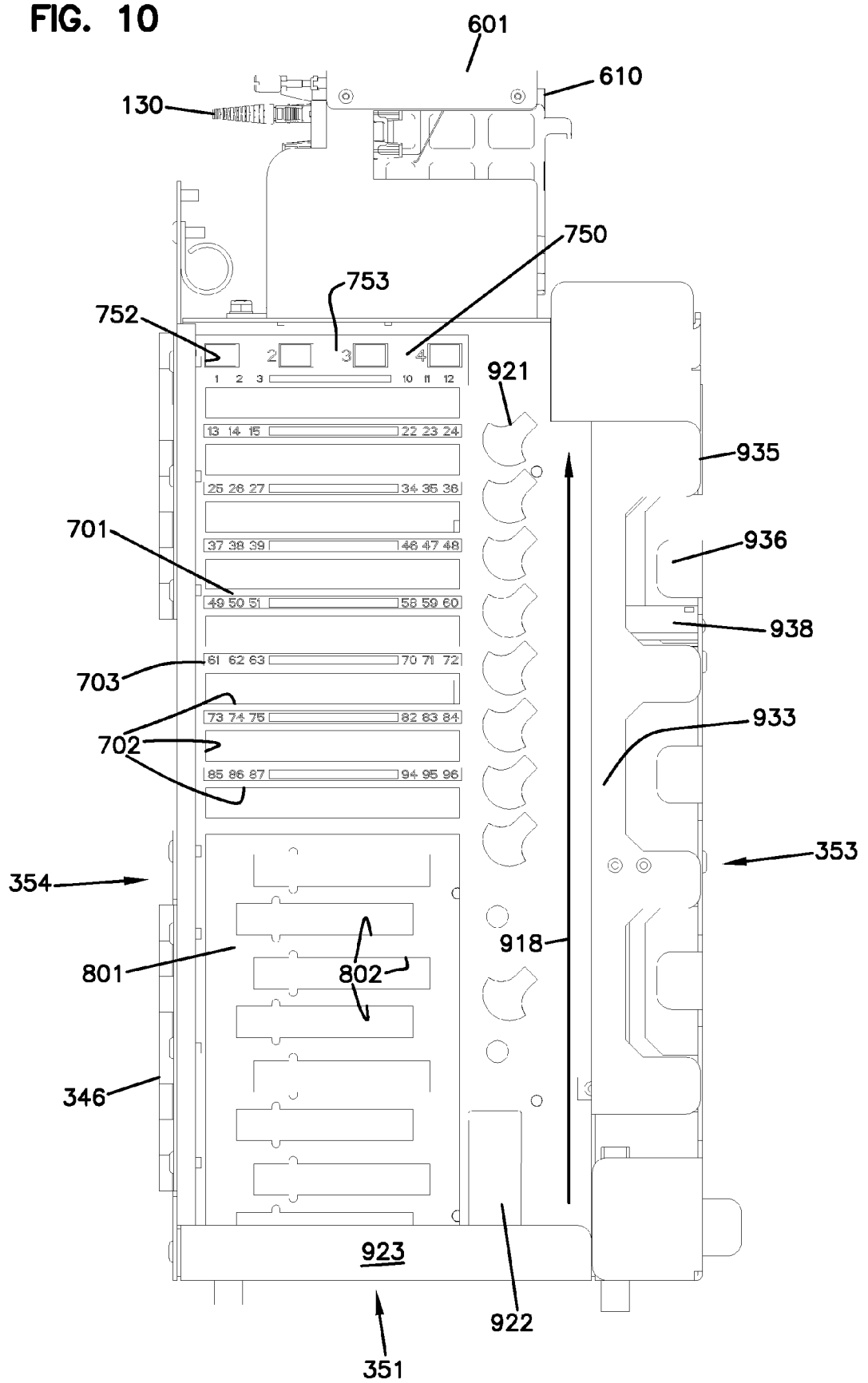
FIG. 10 is a front view of the pedestal terminal of FIG. 8 in accordance with the principles of the present disclosure.
Figure 11:
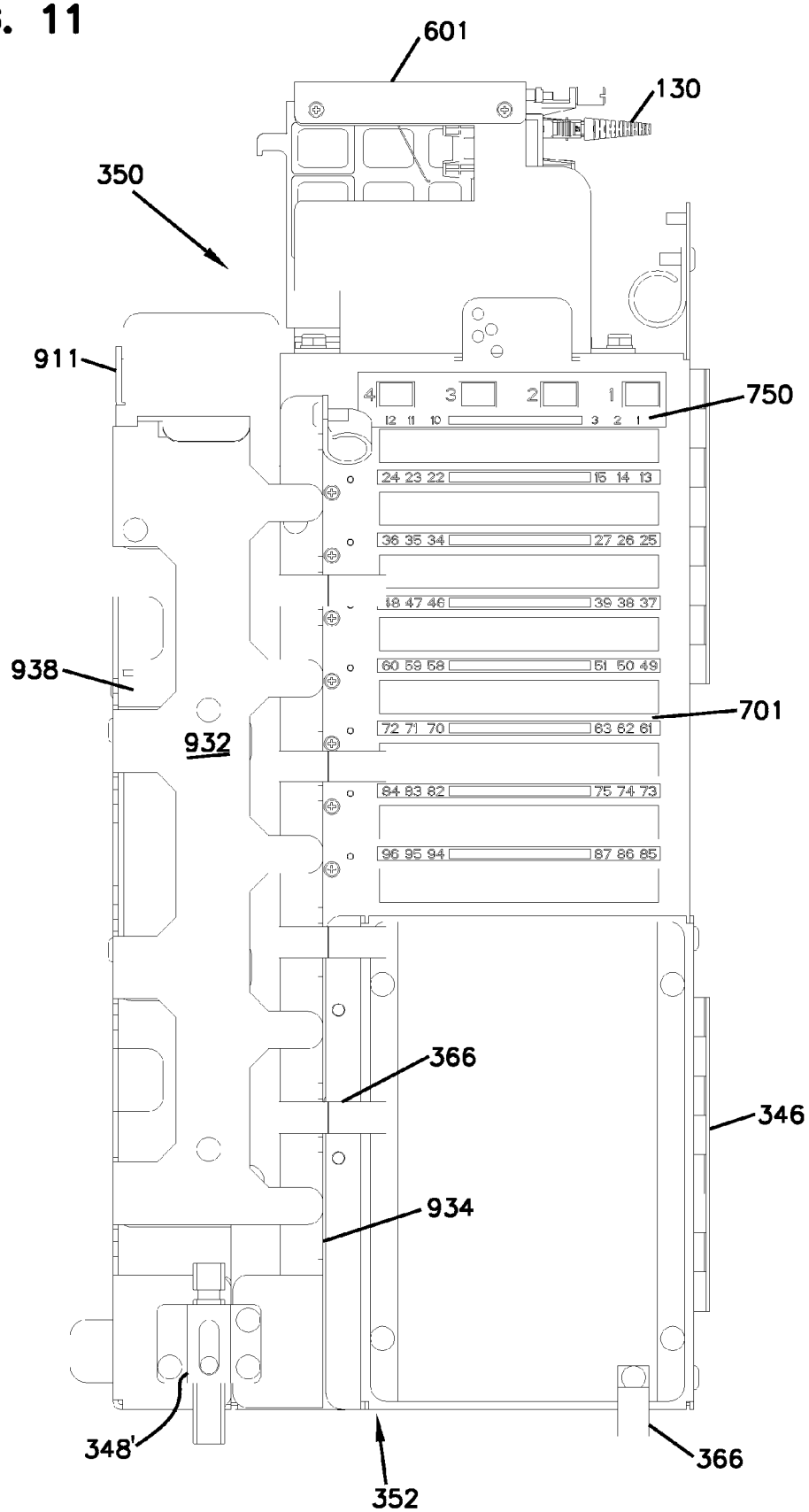
FIG. 11 is a rear view of the pedestal terminal of FIG. 8 in accordance with the principles of the present disclosure.

Referring to FIGS. 8-14, the swing frame 350 carries telecommunications components that aid in creating connection interfaces between one or more feeder cables and one or more distribution cables. The swing frame 350 has a front 351 (FIG. 8), a rear 352 (FIG. 9), a right side 353 (FIG. 8), and a left side 354 (FIG. 9). The front 351 of the swing frame 350 faces the front 302 of the pedestal terminal 300 when the swing frame 350 is arranged in the first (i.e., closed) position. The front 351 of the swing frame 350 faces at least partially toward the side 306, 308 or rear 304 of the pedestal terminal 300 when the swing frame 350 is arranged in the second (i.e., open) position.

The swing frame 350 includes a forward tray defined by a panel or bulkhead 355, a top 356, a bottom 357, a left side 358, and a right side 359 (see FIG. 8). A number of telecommunications components are mounted to the forward tray. For example, in the embodiment shown, a splitter mounting location 220 for mounting a fiber optic splitter arrangement 600 is located on the top 356 of the forward tray. A first termination region 230 for mounting a termination arrangement 700 is located beneath the splitter mounting location 220 on the bulkhead 355 of the forward tray. A second termination region 260 for mounting termination adapters also is located beneath the splitter mounting location 220 on the bulkhead 355. In one embodiment, the second termination region 260 is located above the first termination region 230.

A connector storage location 240 for mounting a connector storage arrangement 800 is positioned beneath the first termination field 230 on the bulkhead 355 of the forward tray of the swing frame 350. One or more cable management regions 250 extend along one or both of the sides 353, 354 of the forward tray. In the example shown, the cable management regions 250 extend along the right side 353 of the swing frame 350. Cable management structures (e.g., fiber storage loops, fiber radii bend limiters, storage clips, etc.) 900 are provided in the cable management regions 250.

A termination arrangement 700 is mounted at the first termination region 230. The termination arrangement 700 includes a plurality of adapters 710 or adapter modules that are disposed on the bulkhead 355 of the swing frame 350. Each adapter 710 defines at least a first port and an opposite second port. Each port is configured to receive a connectorized end of an optical fiber. As is known in the art, the fiber optic adapters are configured to providing an optical coupling between fiber optic connectors inserted into the ports.

Adapter dust caps 720 can be provided initially in one or both ports of each adapter 710 to protect the adapters 710 from dust and other contaminants. The dust cap 720 is removed when a connectorized end of an optical fiber is to be inserted into the adapter 710. In accordance with certain aspects, dust caps 720 are provided only in the first ports of each adapter 710. The second ports are precabled with distribution fibers 114. In accordance with other aspects, however, the distribution fibers 114 can be inserted into the second ports during or subsequent to deployment of the pedestal terminal 300. Adapter dust caps 720 can be provided in these second ports until the connectorized ends of the distribution fibers 114 are inserted.

In accordance with some aspects, the adapters 710 can be arranged in a plurality of rows. For example, each adapter 710 can be mounted within an opening 702 defined in a termination field portion 701 of the swing frame bulkhead 355. In certain embodiments, multiple adapters 710 can be mounted within the same opening 702. Labels 703 for the adapters 710 can be provided adjacent each opening 702. In accordance with other aspects, however, a plurality of adapters 710 can be arranged within an adapter module (not shown). Each adapter module includes a horizontal row of fiber optic adapters 710 (e.g., a row of 6 fiber optic adapters). Each module can be snap-fit, latched, or otherwise mounted within the openings 702 provided in the swing frame bulkhead 355.

In some embodiments, the adapter modules are moveable (e.g., slideable) between a retracted position and an extended position. For example, the adapter modules can be configured to slide forwardly and rearwardly relative to the swing frame bulkhead 355. The retractable/extendable configuration of the adapter modules facilitates accessing the densely populated fiber optic adapters. Moving the adapter module into the extended position provides enhanced access to the ports of the extended adapter module and, accordingly, to the connectors 111, 113 plugged into the ports. Similar sliding adapter modules are described in greater detail in commonly owned U.S. Pat. Nos. 5,497,444; 5,717,810; 6,591,051; and in U.S. Patent Publication No. 2007/0025675, the disclosures of which are incorporated herein by reference.

A second termination arrangement is mounted at the second termination region 260. The termination arrangement includes one or more adapters or adapter modules that are disposed on the bulkhead 355 of the swing frame 350. Each adapter defines at least a first port and an opposite second port. Each port is configured to receive a connectorized end of an optical fiber. For example, the first port is configured to receive a connectorized end of a splitter pigtail 112 and the second port is configured to receive a connectorized end of a patch cable fiber 116.

In accordance with some aspects, the adapters of the second termination arrangement can be arranged into a single row. For example, each adapter can be mounted within an opening 752 defined in a second termination field portion 750 of the swing frame bulkhead 355 (see FIG. 10). In certain embodiments, multiple adapters can be mounted within the same opening 752. Labels or indicia 753 for the adapters can be provided adjacent each opening 752. In accordance with other aspects, however, a plurality of adapters can be arranged within an adapter module (not shown). Adapter dust caps (not shown) can be provided initially in one or both ports of each adapter to protect the adapters from dust and other contaminants. In other embodiments, the adapters can be added to the second termination field portion 750 of the swing frame bulkhead 355 subsequent to deployment of the pedestal terminal 300.

Figure 15:
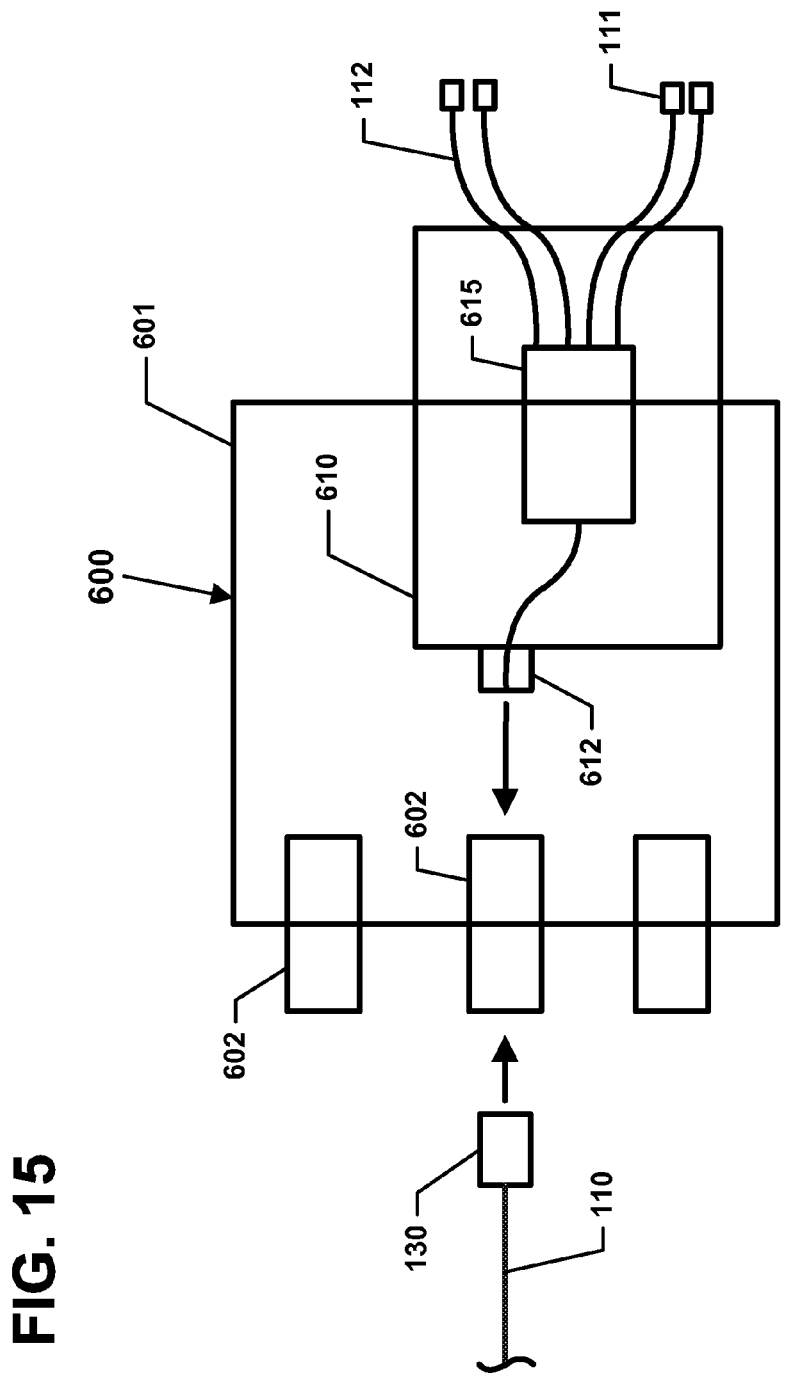
FIG. 15 is a schematic diagram of an example splitter mounting arrangement including multiple fiber optic adapters configured to receive input fibers at first ports and splitter input connectors at second ports to connect the input fibers to a splitter in order to split signals carried by the input fibers to multiple splitter pigtails in accordance with the principles of the present disclosure.
Figure 19:
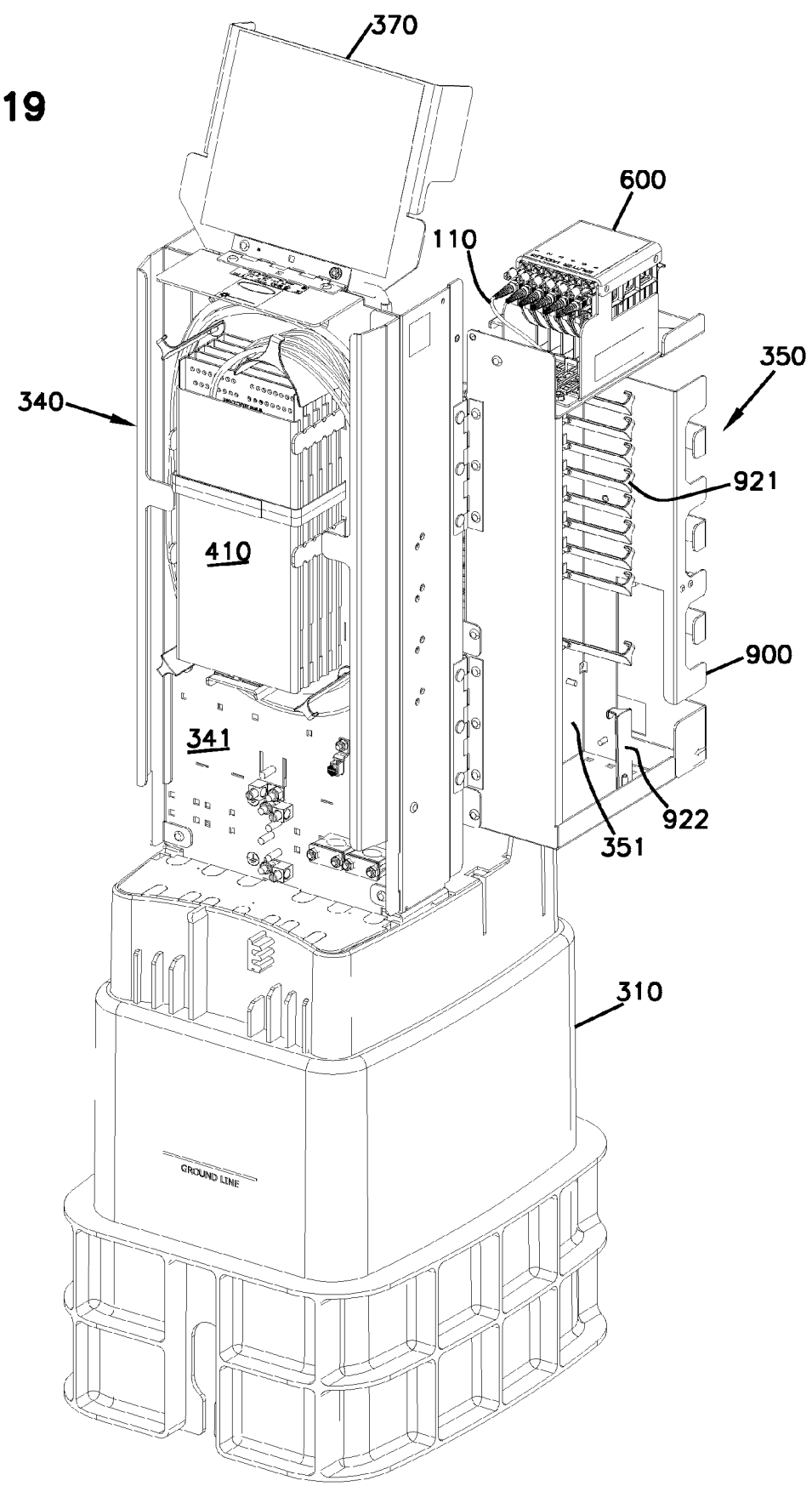
FIG. 19 is a rear, perspective view of the pedestal terminal of FIG. 13 in which the cover is removed, the swing portion of the frame is pivoted open and a top portion of the frame is pivoted upwardly to provide access to a rear of the swinging portion and a front of a support frame in accordance with the principles of the present disclosure.
Figure 20:
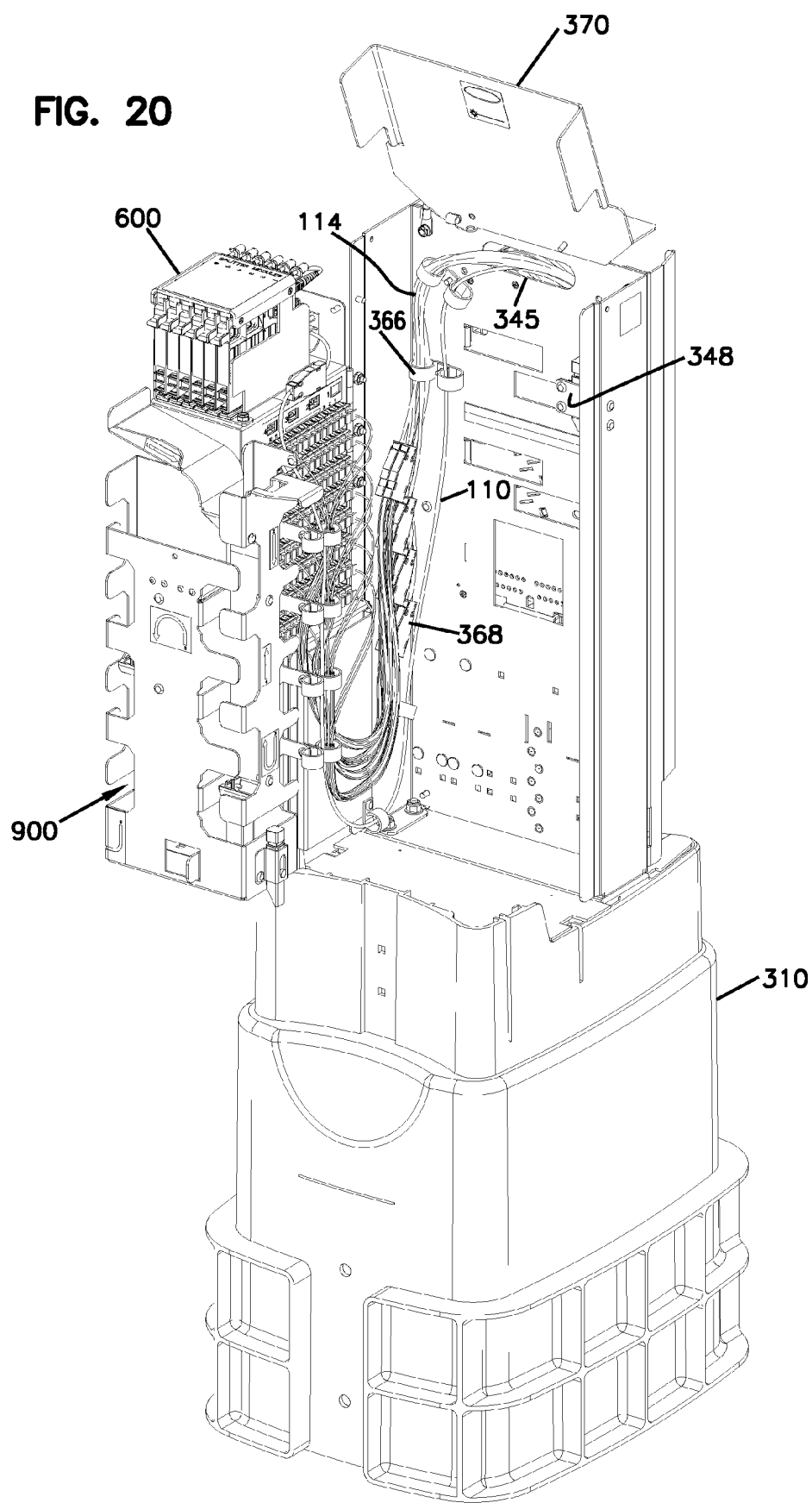
FIG. 20 is a front, perspective view of the pedestal terminal of FIG. 19 in accordance with the principles of the present disclosure.

The splitter input fibers 110 are routed from the support frame 340 to the splitter arrangement 600 at the splitter mounting location 220. For example, the splitter input fibers 110 can be routed onto the left side (i.e., pivot side) of the swing frame 350, up the rear side of the bulkhead 355, to a splitter arrangement 600. The splitter arrangement 600 includes a housing 601 in which one or more splitter modules 610 can be housed. Fiber optic splitter modules 610 containing fiber optic splitters 615 are inserted into the housing 601 and optically connected to the splitter input fibers 110. Within the splitter modules 610, the signals from the input fibers 110 are split at the splitter 615 and directed into a plurality (e.g., 6, 8, 16, etc.) of splitter pigtails 112. A schematic diagram of one example fiber optic splitter arrangement 600 is shown in FIG. 15.

In accordance with some aspects, the fiber optic splitter arrangement 600 has a plug-and-play configuration. In this configuration, the splitter arrangement 600 includes one or more fiber optic adapters 602. A connectorized end 130 of one of the splitter input fibers 110 (i.e., or a feeder cable fiber) plugs into a first end of one of the adapters 602. A fiber optic connector 612 mounted on a fiber optic splitter module 610 plugs into the second end of the adapter 602 to couple the splitter input fiber 110 to a splitter 615 arranged within the fiber optic splitter module 610. Splitter modules 610 and plug and play arrangements similar to those shown herein are described in greater detail in commonly owned U.S. patent application Ser. Nos. 10/980,978, filed Nov. 3, 2004; 11/138, 063, filed May 25, 2005; 11/138,889, filed May 25, 2005; and 11/354,297, filed Feb. 13, 2006, the entire disclosures of which are incorporated herein by reference.

The splitter pigtails 112 are routed away from the splitter modules 610, through cable management structures 900 positioned in the cable management region 250, toward the forward tray of the swing frame 350. For example, the splitter pigtails 112 can be routed through one or more vertical channels arranged on one or both sides 358, 359 of the forward tray as will be discussed in greater detail herein. Connectorized ends 111 of one or more pigtails 112 can be stored at the connector storage arrangements 800 mounted to the forward tray of the swing frame 350 until they are to be put into service. First splitter pigtails 112A can be routed to the front ports of the first termination arrangement 700 at the first termination field 230 as each is put into service. Second splitter pigtails 112B can be routed to the front ports of the second termination arrangement 750 at the second termination field 260 as each is put into service. Alternatively, the connectorized ends 111 of one or more the pigtails 112 can be plugged directly into the adapters of the first and second termination fields 230, 260 of the swing frame 350.

The connector storage arrangement 800 includes one or more connector storage holders 810 (FIGS. 16-18). The connector storage holders 810 are adapted for storing and protecting the connectorized ends 111 of the splitter pigtails 112 when the splitter pigtails 112 are not connected to the termination arrangements 700, 750. Each connector storage holder 810 includes a housing 811 having a first side 815 and a second side 816. The first side 815 of the housing 811 defines one or more (e.g., one, two, six, eight, twelve, etc.) first ports 812 for receiving and releasably holding connectorized ends 111 of the splitter pigtails 112. In one embodiment, the ports 812 define an open end at the first side 815 and a closed end at the second side 816. In another embodiment, the ports 812 extend between two open ends. In general, however, the housing 811 of the connector storage holder 810 is configured to not receive connectorized ends of optical fibers from the second side 816.

The connector storage holders 810 mount within one or more openings 802 defined in a storage portion 801 of the swing frame bulkhead 355. In one embodiment, each connector storage holder 810 includes a latching arrangement 818 including a latch 817 and a tab 819 that facilitate snap-fitting the connector storage holders 810 within openings 802. In other embodiments, other mounting techniques can be utilized. Further details regarding example embodiments of the connector storage blocks 810 can be found in U.S. Pat. Nos. 7,218,827; 7,277,620; 7,233,731; and 7,198,409, the disclosures of which are hereby incorporated herein by reference.

In accordance with some aspects, the connector storage holders 810 are precabled with the splitter pigtails 112. Accordingly, the splitter modules 610 and connector storage holders 810 can be inserted as units during or subsequent to deployment of the pedestal terminal 300. For example, splitter pigtails 112 can extend from an exit member (e.g., a boot) of each splitter module 610 to one or more connector storage holders 810. In one embodiment, each splitter module 610 is associated with two connector storage holders 810. In other embodiments, however, each splitter module 610 can be associated with greater or fewer connector storage holders 810. In still other embodiments, multiple splitter modules 610 can be associated with each connector storage holder 810.

In accordance with some aspects, the swing frame 350 includes cable management structures 900 that facilitate routing of the splitter pigtails 112 from the splitter modules 610 to the termination arrangements 700, 750. For example, the swing frame 350 can include a plurality of cable management channels that are positioned to route the splitter pigtails 112 from the splitter modules 610 to the termination arrangements 700. In the example shown, the splitter pigtails 112 can be routed toward a rear 352 of the swing frame 350, down toward a bottom of the swing frame, along a side 353 of the swing frame, and up a front 351 of the swing frame to the termination field 230. Other example swing frames can define different routing configurations.

In the example shown, the splitter pigtails 112 are routed away from the splitter modules 610 along a ramp 910. The ramp 910 defines a surface 912 that slopes rearwardly and downwardly to a bend radius limiter 914. In the example shown, the ramp 910 includes a side flange 911 and a forward flange 913 bordering the sloped surface 912. The flanges 911, 913 aid in retaining the splitter pigtails 112 within the ramp 910. The ramp 910 directs the splitter pigtails 112 to a first vertical channel 915. After being routed around the side 353 of the swing frame 350, the splitter pigtails 112 are routed up a front channel 918 defined on the front side 351 of the swing frame 350.

For example, one or more bend radius limiters 921 can be arranged along the front 351 of the swing frame bulkhead 355 to facilitate guiding the splitter pigtails 112 to the termination arrangements 700. For example, the bend radius limiters 921 can be arranged in one or more columns along the termination field 230. In one embodiment, each bend radius limiter 921 is associated with one row of termination adapters. In other embodiments, each bend radius limiter 921 is associated with two or more rows of adapters. In certain embodiments, one or more bend radius limiters 921 also can be positioned adjacent the storage arrangement 800. In certain embodiments, one or more fiber retention tabs 922 and a flange 923 also can be positioned on the front 351 of the swing frame 350 to aid in retaining the fibers on the swing frame 350 (see FIG. 10).

In accordance with some aspects, the splitter pigtails 112 have excess length that can be stored within the cable management region 250 of the swing frame 350. More specifically, the excess length can be taken up by fiber storage arrangement 930 positioned within the management region 250. One example storage arrangement 930 suitable for use in the cable management region 250 is shown positioned on the right side 353 of the swing frame 350 in the illustrated embodiment. In other embodiments, however, the storage arrangement 930 can be positioned at different locations on the swing frame 350. Furthermore, different arrangements of cable management structures can be utilized.

The storage arrangement 930 includes a first member 931 extending generally parallel with and spaced from the side wall 359 of the swing frame 350 to define a cage structure around a storage space. The storage arrangement 930 also can include second and third members 932, 933, respectively, extending generally orthogonally to the side wall 359 to further define the cage structure. In the example shown, a fourth member 934 also extends generally parallel with the side wall 359 to further define the cage structure. In certain embodiments, linear and bent tabs 935, 936 extend outwardly from the members 931-934 to further define the cage structure. In the example shown, the storage arrangement defines a storage space having a generally U-shaped cross-section.

One or more storage spools can be positioned within the storage arrangement 930 to define vertical storage channels. In the example shown, a spool 938 (FIG. 10) extends from the side wall 359 of the swing frame 350 to the first member 931 to define first and second side vertical channels 916, 917, respectively. The splitter pigtails 112 can be routed up the first side channel 916, over spool 938, and down the second side channel 917 as the splitter pigtails 112 are routed from the rear 352 to the front 351 of the swing frame 350. Another fiber spool 937 also can be provided coupled to the second member 932 to facilitate routing the splitter pigtails 112 from the ramp 910 into the first side channel 916.

Embodiments of the above described pedestal terminals are suitable for use within a telecommunications network, such as network 100 of FIG. 1. The above specification provides examples of how certain aspects may be put into practice. It will be appreciated that the aspects can be practiced in other ways than those specifically shown and described herein without departing from the spirit and scope of the present disclosure.

What is claimed is:

1. A pedestal terminal comprising:
   a base defining a cable port for receiving a distribution cable and a drop cable;
   a frame mounted to the base, the frame including a support frame and a swing frame pivotally mounted to the support frame, the swing frame being configured to move relative to the support frame from a closed position to an open position;
   a cover including a side wall defining an internal cavity, the cover being configured to be mounted to the base and to receive the frame within the internal cavity when the cover is mounted to the base;
   a splitter module mounting location positioned on the frame, the splitter module mounting location being adapted to mount one or more splitter modules to the frame, each splitter module having a plurality of splitter pigtails;
   ruggedized adapters mounted to the support frame;
   a first termination field including a plurality of fiber optic adapters, each fiber optic adapter of the first termination field being configured to couple one of the splitter pigtails to a distribution fiber that is optically coupled to the distribution cable;
a second termination field including a plurality of fiber optic adapters, each fiber optic adapter of the second termination field being configured to couple one of the splitter pigtails to a patch fiber that is optically coupled to the drop cable; and
patch fibers precabled between the ruggedized adapters and the fiber optic adapters of the second termination field.

2. The pedestal terminal of claim 1, wherein the first termination field is carried by the swing frame.

3. The pedestal terminal of claim 1, wherein the second termination field is carried by the swing frame.

4. The pedestal terminal of claim 1, further comprising:
a connector storage location positioned on the frame for use in storing unused fiber optic connectors.

5. The pedestal terminal of claim 4, further comprising at least one connector holder mounted to the frame at the connector storage location.

6. The pedestal terminal of claim 5, wherein the connector holder is mounted to the swing frame.

7. The pedestal terminal of claim 1, wherein the splitter modules are mounted to the swing frame.

8. The pedestal terminal of claim 1, wherein the patch fibers are optically coupled to the drop cable at the ruggedized adapters.

9. A pedestal terminal comprising:
a base defining a cable port;
a frame mounted to the base;
a splitter arrangement mounted to the frame;
a pivoting cover arrangement mounted to the frame, the pivoting cover arrangement including a first member extending at least partially over the splitter arrangement; and
a cover configured to mount to the base, the cover including a side wall defining an internal cavity, the cover being configured to receive the frame within the internal cavity when the cover is mounted to the base;
wherein the first member of the pivoting cover arrangement inhibits contact between the splitter arrangement and the cover when the cover is mounted to or removed from the base.

10. The pedestal terminal of claim 9, wherein the first member of the pivoting cover arrangement is configured to pivot between a generally horizontal position and an at least partially raised position.

11. The pedestal terminal of claim 9, wherein the frame includes a support frame and a swing frame pivotally mounted to the support frame; and wherein the splitter arrangement is mounted to the swing frame and the pivoting cover is mounted to the support frame.

12. The pedestal terminal of claim 9, wherein the splitter arrangement includes at least a first fiber optic splitter module and a plurality of connectorized splitter pigtails extending from the fiber optic splitter module.

13. The pedestal terminal of claim 12, wherein the frame defines a first termination region at which a plurality of fiber optic adapters are mounted, each of the fiber optic adapters of the first termination region having a first port configured to receive one of the connectorized splitter pigtails and having a second port configured to receive a connectorized end of a distribution fiber.

14. The pedestal terminal of claim 13, wherein the frame defines a second termination region at which at least one fiber optic adapter is mounted, each of the fiber optic adapters of the second termination region having a first port configured to receive one of the connectorized splitter pigtails and having a second port configured to receive a connectorized end of a patch cable fiber that is optically coupled to a drop cable.

15. The pedestal terminal of claim 9, further comprising an interface arrangement mounted to the frame, wherein the pivoting cover arrangement includes a second member that extends at least partially over the interface arrangement.

16. The pedestal terminal of claim 15, wherein the second member is pivotally coupled to the support frame to enable the second member to pivot from a first, generally horizontal position, to a at least partially raised position.

17. A pedestal terminal comprising:
a base;
a frame mounted to the base, the frame including a support frame and a swing frame pivotally mounted to the support frame, the swing frame being configured to move relative to the support frame from a closed position to an open position;
a cover including a side wall defining an internal cavity, the cover being configured to be mounted to the base and to receive the frame within the internal cavity when the cover is mounted to the base;
a splitter module mounting location positioned on the frame, the splitter module mounting location being adapted to mount one or more splitter modules to the frame, each splitter module having a plurality of splitter pigtails;
a plurality of non-ruggedized fiber optic adapters mounted to the swing frame, each non-ruggedized fiber optic adapter being configured to optically couple one of the splitter pigtails to a distribution cable;
a plurality of ruggedized fiber optic adapters mounted to the support frame, each ruggedized fiber optic adapter being configured to couple one of the splitter pigtails to a drop cable.

* * * * *